US009641691B1

(12) United States Patent
Miller et al.

(10) Patent No.: US 9,641,691 B1
(45) Date of Patent: May 2, 2017

(54) IP TELEPHONY NETWORK USING A CONFIGURATION MAP FOR ORGANIZING SITES

(71) Applicant: ShoreTel, Inc., Sunnyvale, CA (US)

(72) Inventors: Thomas E. Miller, Mountain View, CA (US); Dale C. Tonogai, Los Altos, CA (US); Kishore Nadimpalli, Sunnyvale, CA (US); Stephen M. Winter, Milpitas, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 246 days.

(21) Appl. No.: 14/455,704

(22) Filed: Aug. 8, 2014

Related U.S. Application Data

(63) Continuation of application No. 13/014,536, filed on Jan. 26, 2011, now Pat. No. 8,897,172, which is a continuation of application No. 12/247,798, filed on Oct. 8, 2008, now Pat. No. 7,924,823, which is a continuation of application No. 10/424,491, filed on Apr. 25, 2003, now Pat. No. 7,450,574.

(51) Int. Cl.
*H04L 12/28* (2006.01)
*H04M 7/00* (2006.01)
*H04M 3/22* (2006.01)
*H04L 12/24* (2006.01)

(52) U.S. Cl.
CPC ........ *H04M 7/0081* (2013.01); *H04L 41/085* (2013.01); *H04L 41/0893* (2013.01); *H04M 3/2263* (2013.01)

(58) Field of Classification Search
USPC ....... 370/328, 395.31, 395.32; 709/223, 224, 709/225, 226, 228, 229
See application file for complete search history.

(56) References Cited

U.S. PATENT DOCUMENTS

| 5,598,412 | A  | 1/1997  | Griffith et al.   |
|-----------|----|---------|-------------------|
| 6,460,025 | B1 | 10/2002 | Fohn et al.       |
| 7,046,778 | B2 | 5/2006  | Martin et al.     |
| 7,055,107 | B1 | 5/2006  | Rappaport et al.  |
| 7,107,594 | B1 | 9/2006  | Fischer et al.    |
| 7,216,350 | B2 | 5/2007  | Martin et al.     |
| 7,277,935 | B2 | 10/2007 | Sato              |
| 7,295,960 | B2 | 11/2007 | Rappaport et al.  |
| 7,450,574 | B1 | 11/2008 | Miller et al.     |
| 7,606,885 | B2 | 10/2009 | Sundqvist et al.  |
| 7,924,823 | B2 | 4/2011  | Miller et al.     |
| 2003/0012182 | A1 | 1/2003 | Sato             |

(Continued)

OTHER PUBLICATIONS

Non-Final Office Action of Feb. 21, 2008 for U.S. Appl. No. 10/424,491, 11 pages.

(Continued)

*Primary Examiner* — Alvin Zhu
(74) *Attorney, Agent, or Firm* — The Mueller Law Office, P.C.

(57) ABSTRACT

A system and method for managing an IP telephony network that uses a configuration map for organizing sites in a tree-like hierarchy. The system is capable of managing the addition, removal and movement of IP telephony elements within an IP telephony network and locating services and IP telephony elements within the IP telephony network in an efficient manner.

24 Claims, 44 Drawing Sheets

A sample implementation of the IP telephony network of Figure 1

(56) References Cited

U.S. PATENT DOCUMENTS

2004/0088142 A1* 5/2004 Ashley ............... H04L 41/0253
702/184
2004/0143428 A1 7/2004 Rappaport et al.

OTHER PUBLICATIONS

Notice of Allowance of Sep. 10, 2008 for U.S. Appl. No. 10/424,491, 6 pages.
Non-Final Office Action of Mar. 10, 2010 for U.S. Appl. No. 12/247,798, 15 pages.
Final Office Action of Aug. 2, 2010 for U.S. Appl. No. 12/247,798, 6 pages.
Notice of Allowance of Dec. 14, 2010 for U.S. Appl. No. 12/247,798, 7 pages.
Non-Final Office Action of Sep. 17, 2012 for U.S. Appl. No. 13/014,536, 12 pages.
Final Office Action of Mar. 6, 2013 for U.S. Appl. No. 13/014,536, 8 pages.
Non-Final Office Action of Aug. 27, 2013 for U.S. Appl. No. 13/014,536, 7 pages.
Final Office Action of Jan. 2, 2014 for U.S. Appl. No. 13/014,536, 8 pages.
Notice of Allowance of Apr. 29, 2014 for U.S. Appl. No. 13/014,536, 5 pages.

* cited by examiner

An IP telephony network

A sample implementation of the IP telephony network of Figure 1

An embodiment of a server

A sample of modules in the memory of a primary server at a headquarter site

A sample of modules in the memory of a server
other than a primary server at the headquarter site A sample organization
of sites in a tree-like hierarchy An embodiment of a switch An overview of a sample IP telephony network organized in a tree-like hierarchy Add Extension Add trunk Add switch Add server Add site Remove extension Remove trunk Remove switch Remove server Remove site Move extension Move trunk Move switch Move server Move site Adding an extension Adding a trunk Adding a switch Assigning a server to provide services Adding a server Adding a site Removing an extension Removing a trunk Removing a switch Removing a server Updating a switch at the site of the removal of the
server at the site Updating all switches at a
younger generation site of the removal of the server Finding an alternate server to provide services to the switch Removing a site Moving an extension Moving a trunk Moving a switch Moving a server Moving a site Locating a second extension or trunk from a first extension Locating a second extension or trunk from a first trunk

IP TELEPHONY NETWORK USING A CONFIGURATION MAP FOR ORGANIZING SITES

CROSS REFERENCE TO RELATED APPLICATIONS

This application is a continuation of U.S. patent application Ser. No. 13/014,536, filed Jan. 26, 2011, which is a continuation of U.S. patent application Ser. No. 12/247,798, filed Oct. 8, 2008, now U.S. Pat. No. 7,924,823, which is a continuation of U.S. patent application Ser. No. 10/424,491, filed Apr. 25, 2003, now U.S. Pat. No. 7,450,574, each of which is incorporated by reference herein for all purposes.

BACKGROUND OF THE INVENTION

1. Field of the Invention

The present invention relates to an IP telephony network using a configuration map for organizing sites in a tree-like hierarchy. The present invention specifically relates to the management of the addition to, removal from and movement of IP telephony elements within an IP telephony network. The present invention further relates to the locating of services and IP telephony elements within the IP telephony network.

2. Description of Background Art

An IP telephony network may generally be composed of a number sites or "campuses." Each site may have any number of interconnected servers, switches, extensions and/or trunks, all of which make up the network. Managing these sites, servers, switches, extensions and/or trunks ("IP telephony elements") in an IP telephony network can be difficult and time and resource intensive, especially as the number of IP telephony elements expands. Managing a network requires the ability to, among other things, handle the addition, removal and movement of sites, servers, switches, extensions and/or trunks within an IP telephony network in such a manner so that services and IP telephony elements may be located when needed within the network.

In some implementations in the prior art, the mere addition of an extension to the network, for example, involves much greater administrative efforts and resources. Specifically, any time an extension is added to the network, all switches and servers in the network have to be updated to reflect the addition of the new extension. This requires significant memory, computational resources and administrative efforts to manage. Further, as the number of IP telephony elements in the network expands, the network does not easily scale.

In other implementations in the prior art, not all switches and servers have to be updated as a result of an addition of a new extension. However, in such other implementations, locating an extension within the network, for example, requires use of router services located at a single (primary) server located at a headquarter site. Because all switches in the network have to consult the single primary server in order to locate an extension or trunk, the result is often a bottleneck at the headquarter site. Even worse, if the connection to the headquarter site is down or if the primary server is down, the network becomes inoperable since locator services are only provided by the single primary server located at the headquarter site. Further, as the number of IP telephony elements increases, the prior art implementation is not scalable since there is a limit to the number of switches a single primary server can support.

As with the addition of an extension to an IP telephony network, the same problems exist in the prior art with the removal or movement of an extension and the addition, removal or movement of a trunk, switch, server and/or site within an IP telephony network. Specifically, either all switches and servers have to be updated with the addition, removal or movement of one IP telephony element in the network, or if not all switches and servers need be updated upon the addition, removal or movement of one element, then services can only be obtained from a single primary server located at a single headquarter site. Thus, the prior art implementations are not scalable. Further, in the prior art, the administration of the IP telephony elements is cumbersome and resource and time intensive, and the location of the IP telephony elements and services within an IP telephony network not robust.

SUMMARY OF THE INVENTION

The present invention overcomes the deficiencies and limitations of the prior art by providing an IP telephony network using a configuration map for organizing sites in a tree-like hierarchy. By storing the sites in a tree-like hierarchy in a configuration map, not all IP telephony elements need to be updated each time one IP telephony element is added to, removed from or moved within the network. As a result, less memory, computational resources and administrative efforts are required to manage the network.

Moreover, having servers distributed throughout the network capable of providing services to the switches, extensions and trunks and accessible by tracing the tree-like hierarchy in a configuration map minimizes bottleneck in the system, makes the system scalable and more robust. For example, if the connection to the headquarter site is down, the rest of the system can still function because a large portion of the services can be provided locally. Also, if a local server is down, the configuration map with its organization of sites in a tree-like hierarchy can be traced to locate an alternate server to provide backup services (e.g., voicemail services, auto attendant services, etc.).

A further advantage of a configuration map for organizing sites in tree-like hierarchy is that it may be used to assign (or associate) a server to a switch in an efficient and easy-to-use manner. Specifically, when a switch is added to the network, a server needs to be assigned to it in order to service the needs of the extensions and trunks connected to the switch. By consulting the configuration map and tracing the tree-like hierarchy to find a server, the system will automatically locate a server that is located near the switch.

The result of all of the above mentioned advantages is an IP telephony network system containing IP telephony elements that is easier, more efficient and less expensive to manage and to locate services and other IP telephony elements.

BRIEF DESCRIPTION OF THE DRAWINGS

The present invention will be best understood with reference to the following drawings in which.

DETAILED DESCRIPTION OF THE PREFERRED EMBODIMENTS

Figure 1:
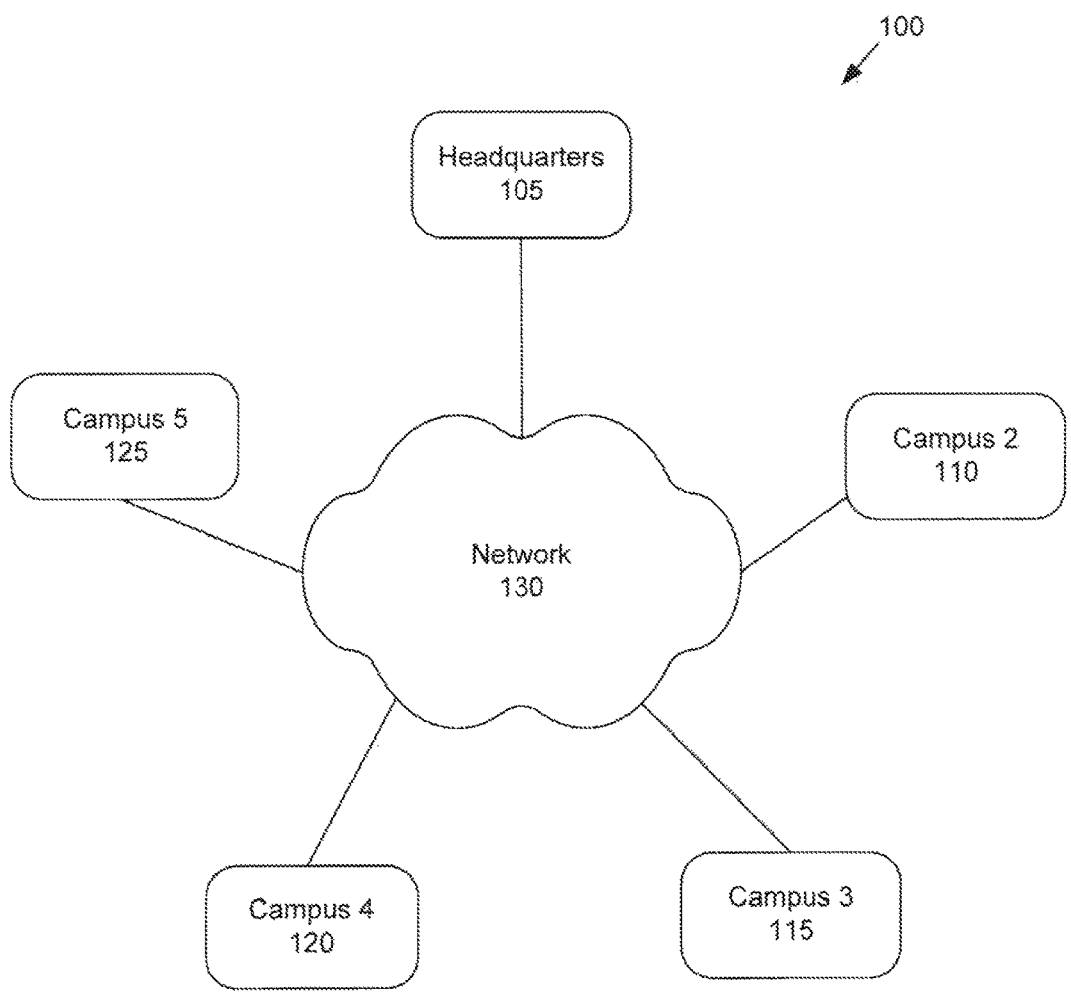
FIG. 1 is a block diagram of an IP telephony network.

FIG. 1 is a block diagram illustrating a sample IP telephony network 100 that has five sites, 105, 110, 115, 120 and 125, called "Headquarters," "Campus 2," "Campus 3," "Campus 4" and "Campus 5" respectively. Each site 105, 110, 115, 120 and 125 is connected to a network 130 which may be the Internet, WAN, LAN or other network known in the art.

Figure 2:
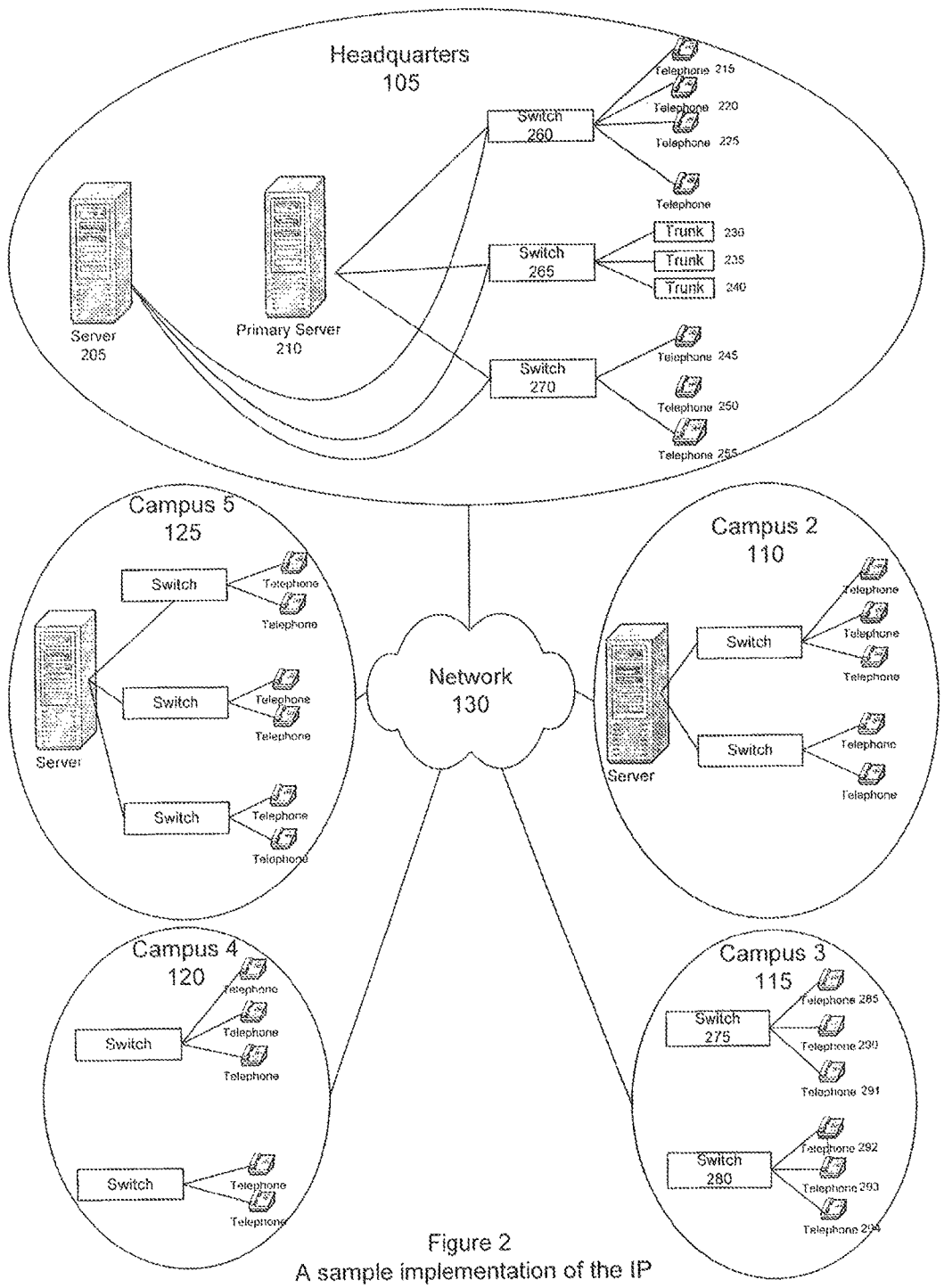
FIG. 2 is a sample implementation of the IP telephony network of FIG. 1.

FIG. 2 is a sample implementation of the IP telephony network of FIG. 1, shown in more detail. The headquarter site 105, for example, is composed of a server 205, a primary server 210, three switches 260, 265 and 270, seven telephone extensions 215, 220, 225, 245, 250 and 255 and three trunks 230, 235 and 240. Campus 3 115, on the other hand, is composed of no servers, two switches 275 and 280 and six telephone extensions 285, 290, 291, 292, 293 and 294. Each extension or trunk is connected to a switch, and each site is coupled to the network. Each extension, trunk, switch and server is located at a site in the network. A site may or may not have a server, switch, trunk or extension located at the site. An extension need not be limited to a telephone extension. Extensions may include any type of extensions known in the IP telephony art including, but not limited to, the following types: user extension, auto attendant, backup auto attendant, voicemail extension, voicemail login extension, nightbell, paging, menu, workgroup, broadcast, distribution list, route point, audio messaging interface specification ("AMIS") test mailbox, local auto attendant, local voicemail extension, local voicemail login extension and account code extension.

Figure 3:
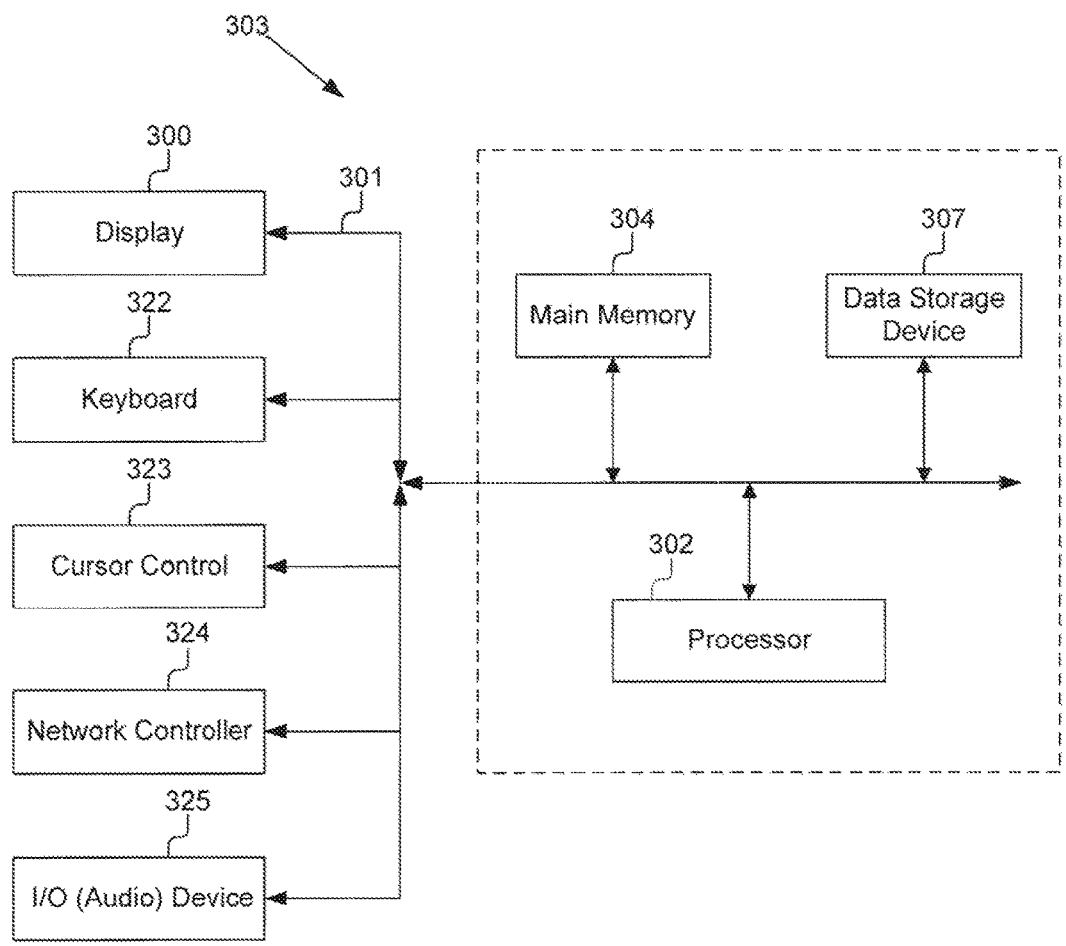
FIG. 3 is a block diagram illustrating an embodiment of a server.

FIG. 3 is a block diagram illustrating an embodiment of a server 303. In a preferred embodiment, a server 303 consists of a main memory 304, a data storage device 307, a processor 302, a display 300, a keyboard 322, a cursor control 323, a network controller 324 and an I/O (audio) device 325, all coupled via and communicating over a bus 301.

Figure 4:
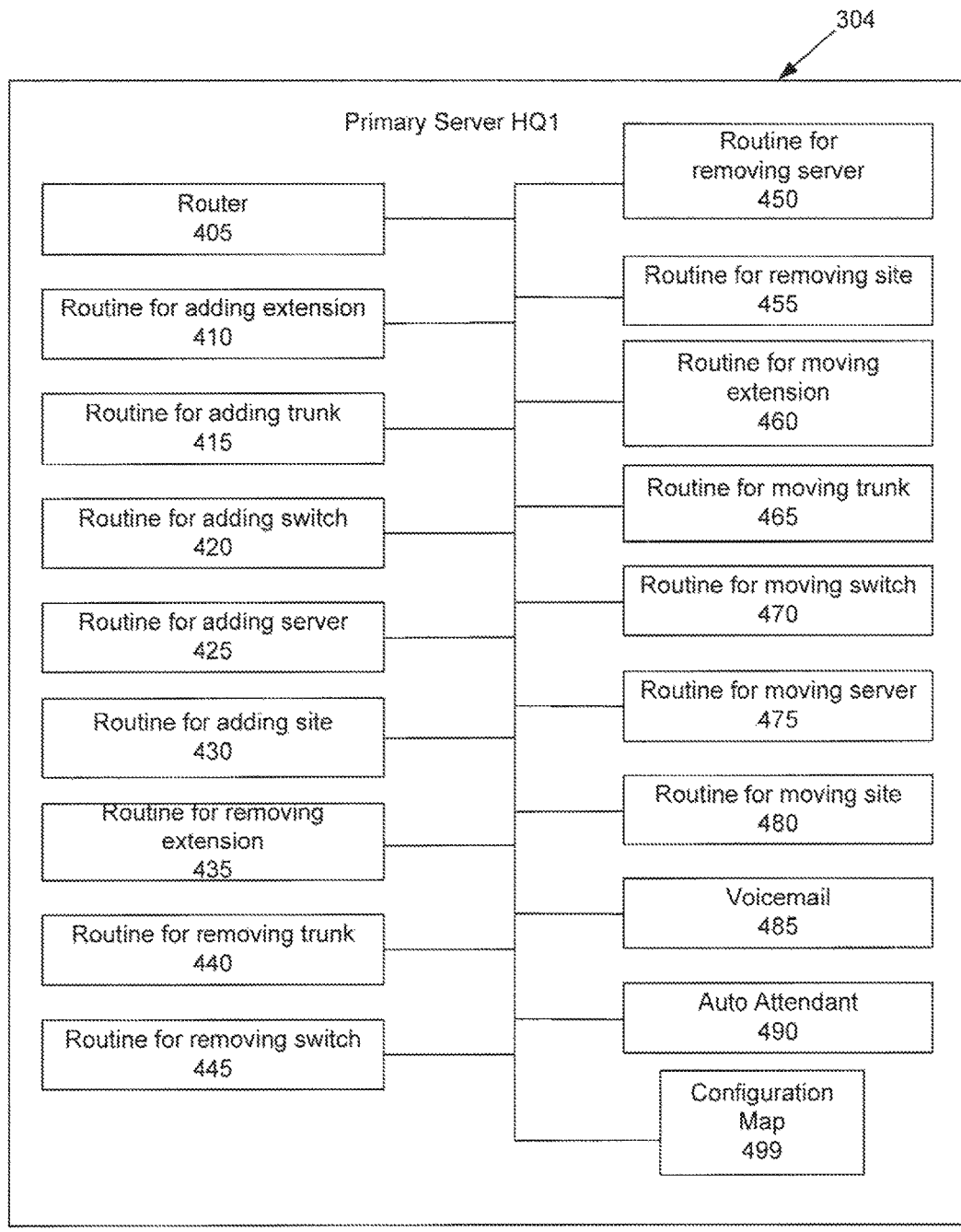
FIG. 4 is a block diagram illustrating modules in the main memory of a primary server at a headquarter site.

FIG. 4 is a block diagram of some of the modules in the main memory 304 of a primary server 210 located at a headquarter site 105 in an IP telephony network 100. In a preferred embodiment of the invention, the main memory 304 for the primary server 210 includes:

(a) modules for providing services, such as routing services provided by a router 405 (sometimes referred to also as "distributed routing services"), conventional voicemail services provided by a voicemail module 485 and conventional auto attendant services provided by an auto attendant module 490;

(b) a configuration map 499; and (c) routines for (i) adding an extension 410, trunk 415, switch 420, server 425 and site 430, (ii) removing an extension 435, trunk 440, switch 445, server 450 and site 455, and (iii) moving an extension 460, trunk 465, switch 470, server 475 and site 480.

In the present invention, the configuration map 499 stores the location of each IP telephony element in the IP telephony network. The configuration map 499 further keeps track of the location of each IP telephony element in the network relative to the other IP telephony elements in the network. This configuration map organizes sites in the network in a tree-like hierarchy as illustrated, for example, in FIG. 6 and is accessible by the routines for adding, removing and moving an extension, trunk, switch, server and site. In a preferred embodiment, the configuration map is stored in a primary server 210 located at a headquarter site 105.

Figure 5:
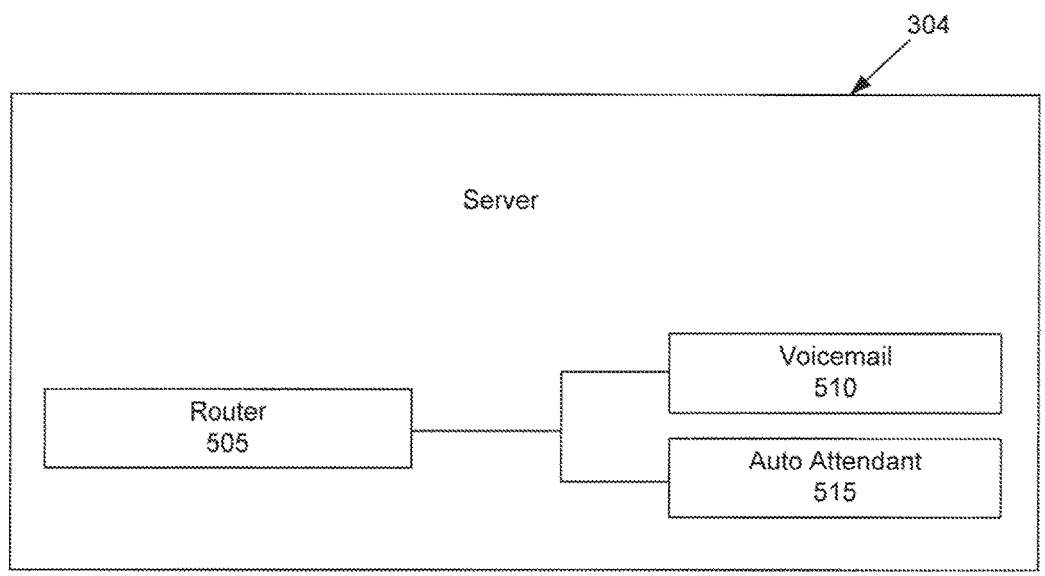
FIG. 5 is a block diagram illustrating modules in the main memory of a server other than a primary server at a headquarter site.

Also in a preferred embodiment, as illustrated in FIG. 5, other servers in the IP telephony network (other than a primary server 210 located at a headquarter site 105) would not contain in their main memory 304 a configuration map or routines for adding, removing or moving an extension, trunk, switch, server or site. Instead, the other servers would contain modules for providing services, such as routing services provided by a router 505, voicemail services provided by a voicemail module 510 and auto attendant services provided by an auto attendant module 515.

Other modules (not shown) that may be included in the main memory 304 of a server (whether primary or non-primary) include, but are not limited to, modules for providing the following services: client/server internet services, event watch server services, java server services, voicemail message server services, voicemail port manager services, software telephony switch services, distributed routing services and telephony management server services. In addition to those listed in the preceding sentence, other modules (not shown) that may be included in the main memory 304 of the primary server 210 include: account code collection services, call accounting services, IP phone configuration services, IP phone display services, workgroup services and database management services. As shown in FIGS. 4 and 5, each of the modules in the main memory 304 of a server is coupled to the other modules.

Figure 6:
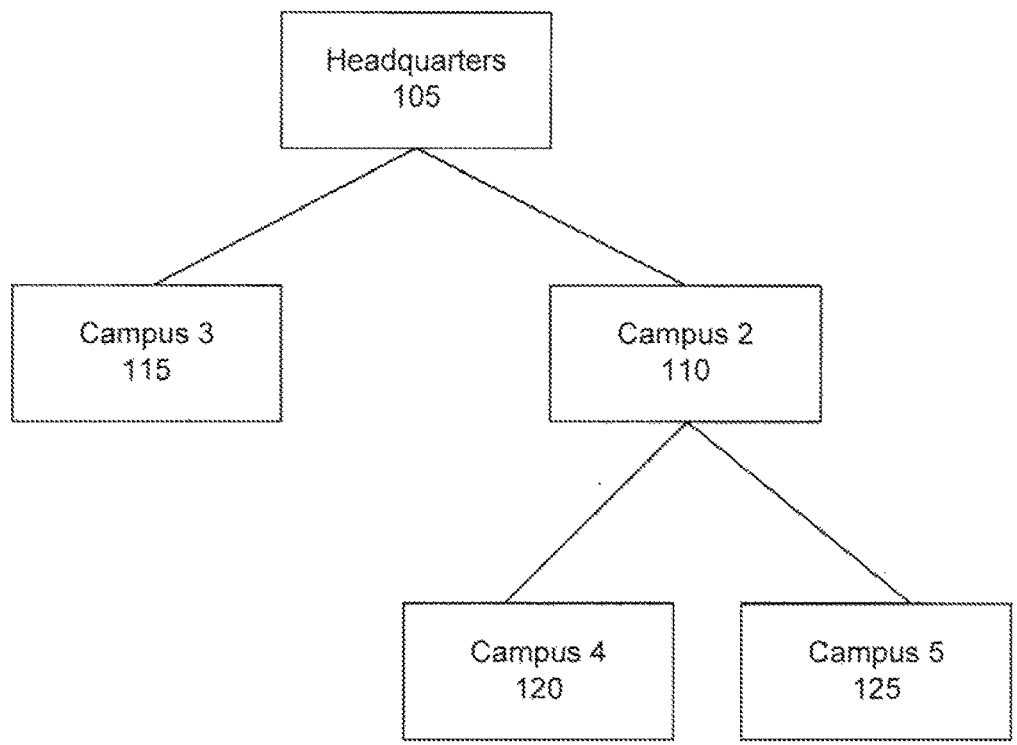
FIG. 6 is a block diagram illustrating a sample organization of sites in a tree-like hierarchy in a configuration map.

FIG. 6 illustrates a sample organization of sites in an IP telephony network in a tree-like hierarchy in a configuration map. Note that, except for the headquarter site 105 located at the root of the tree-like hierarchy, each site has a parent site associated with it. A parent site is the site directly connected to a site, but located one level closer to the headquarter site 105 (i.e., at an older generation site). A site may also have associated with it one or more "child sites." A child site is a site that is connected directly to the site at issue, but is located one level further away from the headquarter site 105 than the site at issue. For example, referring to FIG. 6, Campus 2 110 has one parent site, which is the headquarter site 105, and two children sites, which are Campus 4 120 and Campus 5 125. The headquarter site 105 is an older generation site relative to Campus 2 110, and Campus 4 120 and Campus 5 125 are younger generation sites relative to Campus 2 110. If Campus 5 125 had a child site, this child site would be a younger generation site relative to Campus 2 110 and Campus 5 125. In this invention, no site in the tree-like hierarchy may have as a child a site located at an older generation site or a site at the same generation. Referring again to FIG. 6, Campus 2 110 and Campus 3 115 are sites at the same generation (i.e., both are one level removed from or younger than the headquarter site). Hence, Campus 2 110 cannot be a child of Campus 3 115. Nor can the headquarter site 105 be the child of Campus 2 110 or Campus 3 115.

Figure 7:
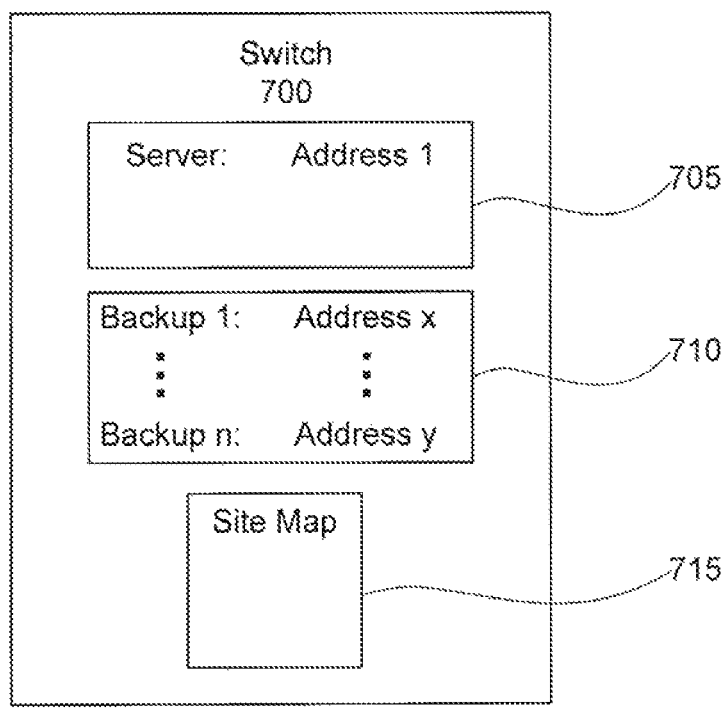
FIG. 7 is an embodiment of a switch.

FIG. 7 is a block diagram illustrating a preferred embodiment of a switch 700. As shown in FIG. 7, a switch has associated with it a server 705 and any number of backup servers 710. In addition, a switch has associated with it a site map 715. The site map 715 keeps track of the location of all extensions, trunks and switches at a site and may be used to locate any of these IP telephony elements at the site. Any type of extension or trunk may be connected to a switch. A switch may be a physical switch implemented in hardware or a virtual switch implemented in software on a server (sometimes also referred to as a "soft switch").

Figure 8:
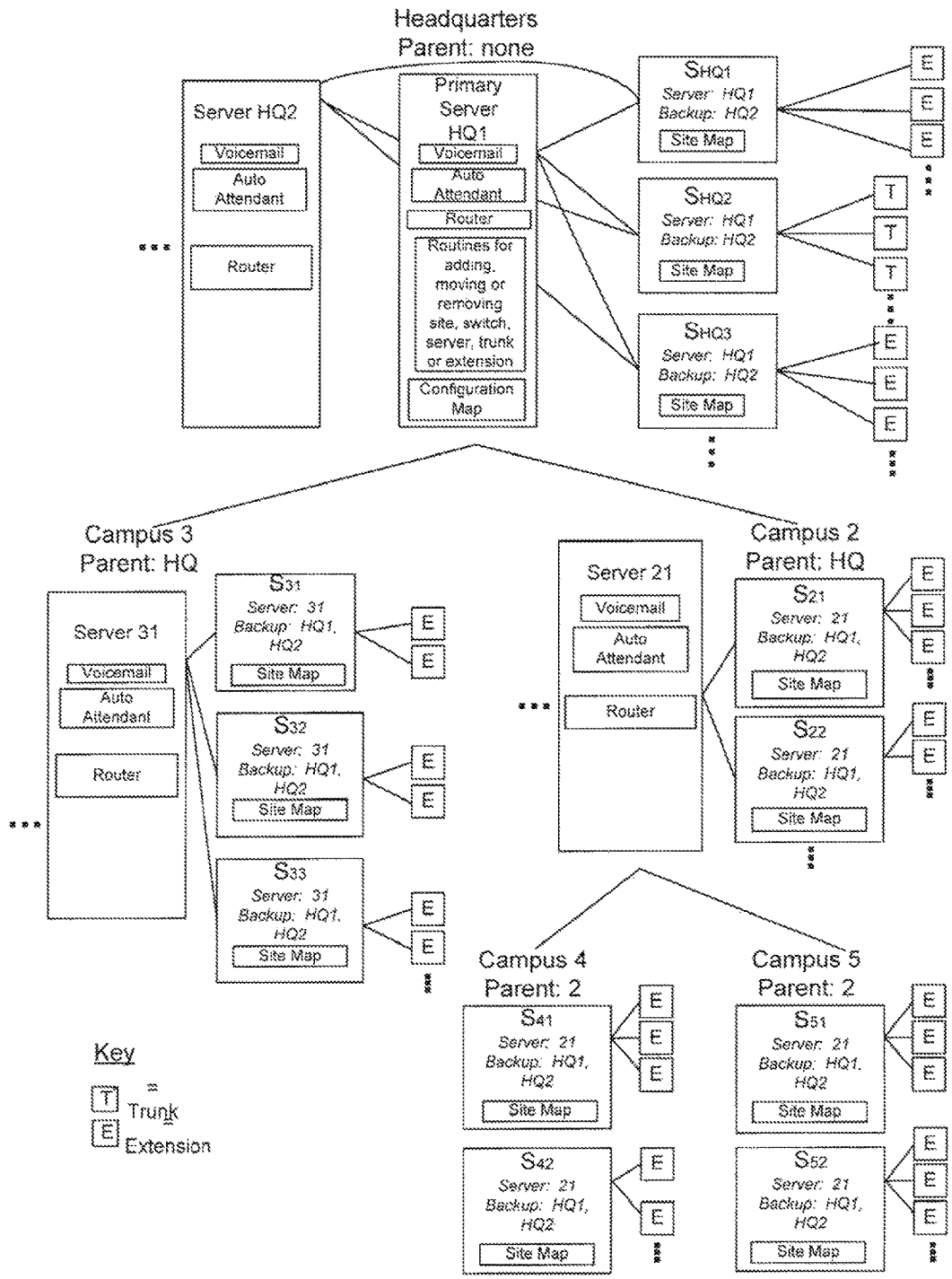
FIG. 8 is an overview of a sample IP telephony network organized in a tree-like hierarchy.

FIG. 8 is an overview of another sample IP telephony network, with the sites organized in a tree-like hierarchy. Note that this tree-like hierarchy is the preferred structure used by the configuration map to organize the sites. The sites need not be physically connected in a tree-like hierarchy.

Figure 43:
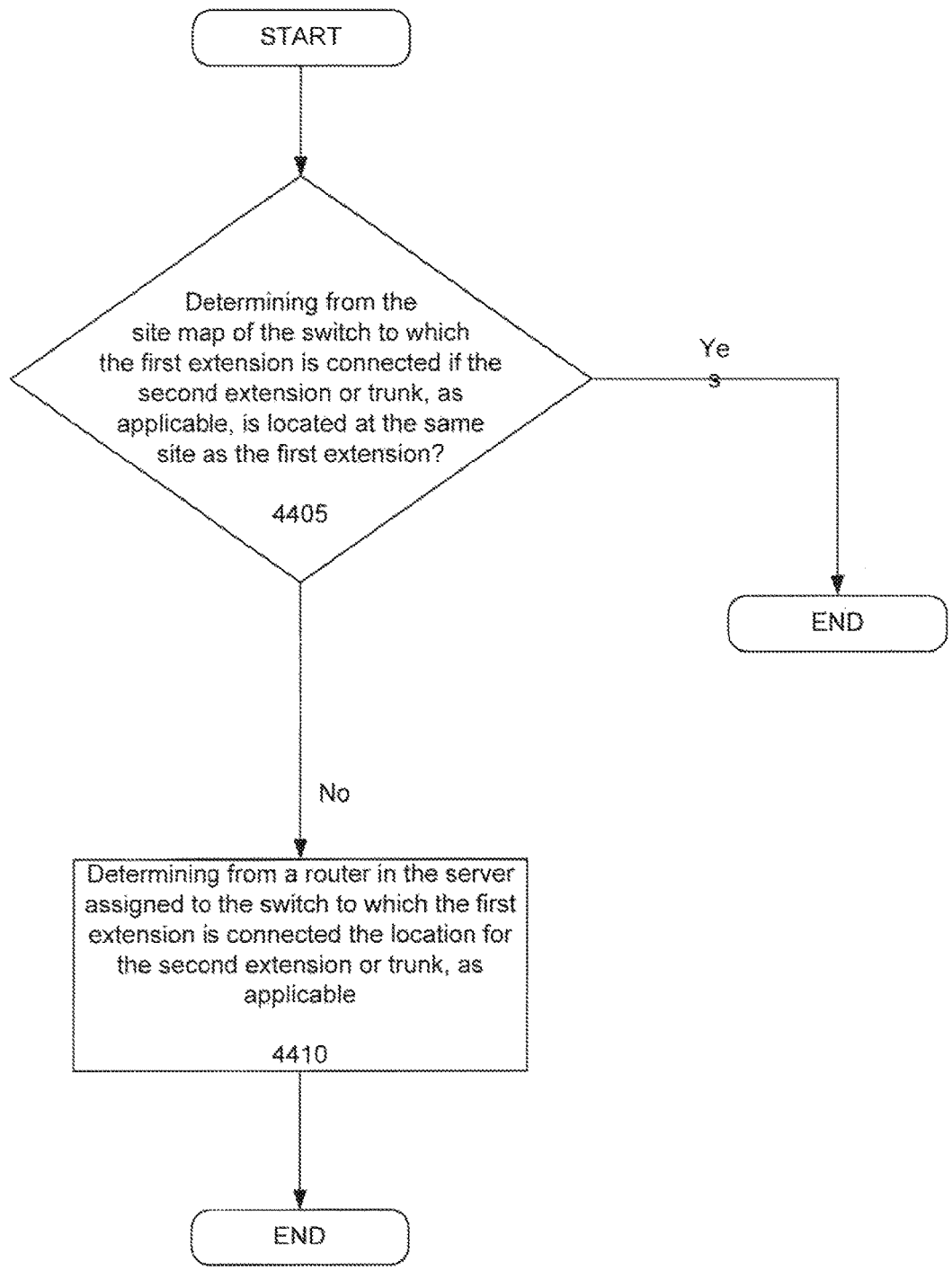
FIG. 43 is a flow diagram of a preferred method for locating a second extension or trunk from a first extension within an IP telephony network.
Figure 44:
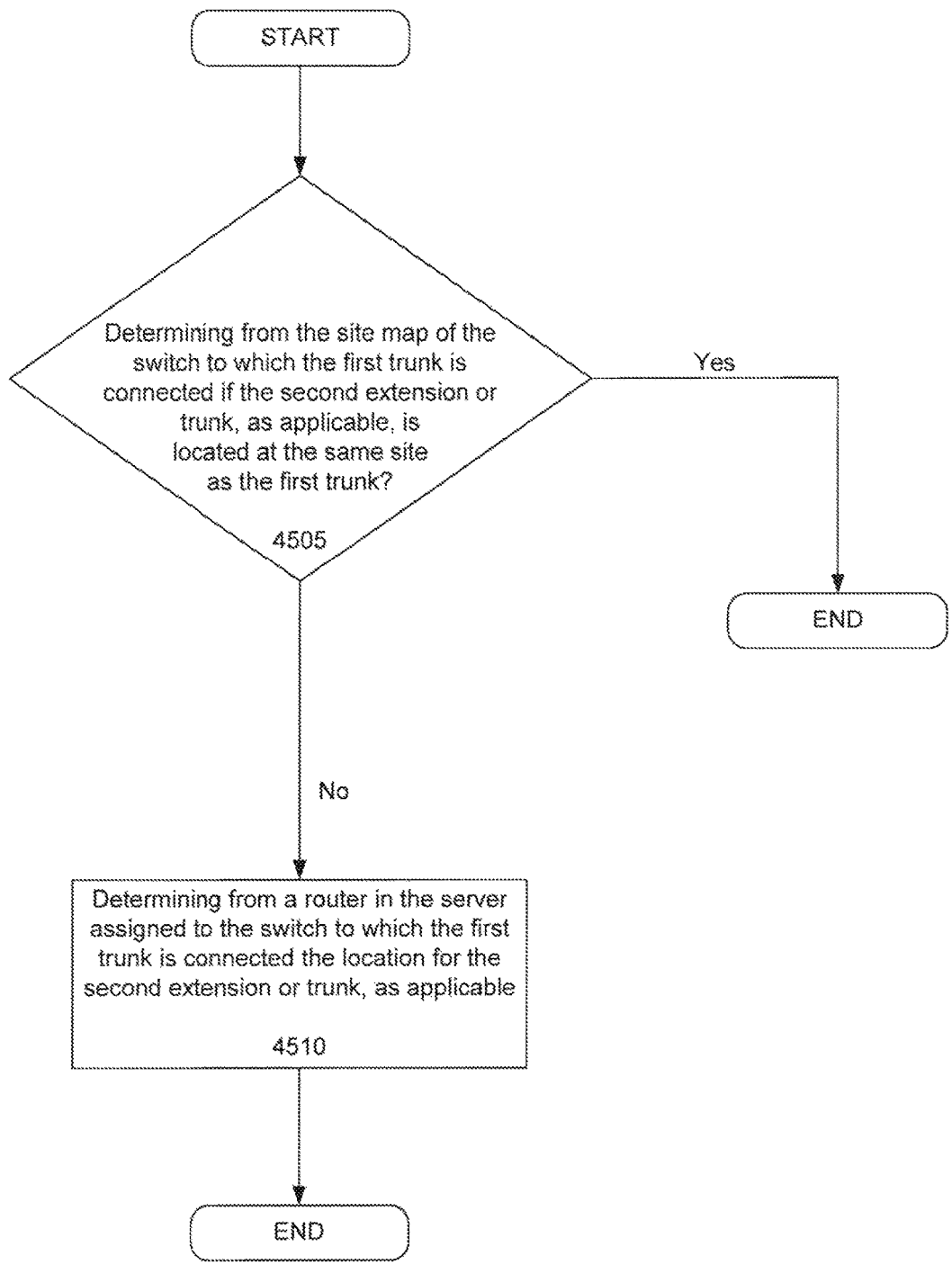
FIG. 44 is a flow diagram of a preferred method for locating a second extension or trunk from a first trunk within an IP telephony network.

FIGS. 9-23 diagrammatically illustrate the effects of an addition, removal or movement of an IP telephony element in an IP telephony network in an embodiment of the invention. Additions are shown in bold and deletions in shaded, dotted lines. Modifications or updates to an item (such as the configuration map, routers, site maps, etc.) are indicated in bold as well. FIGS. 24-43 illustrate a preferred method for adding, removing and moving an extension, trunk, switch, server or site in an IP telephony network. FIGS. 44 and 45 illustrate a preferred method for locating a second extension or trunk from a first extension or trunk, respectively.

Figure 9:
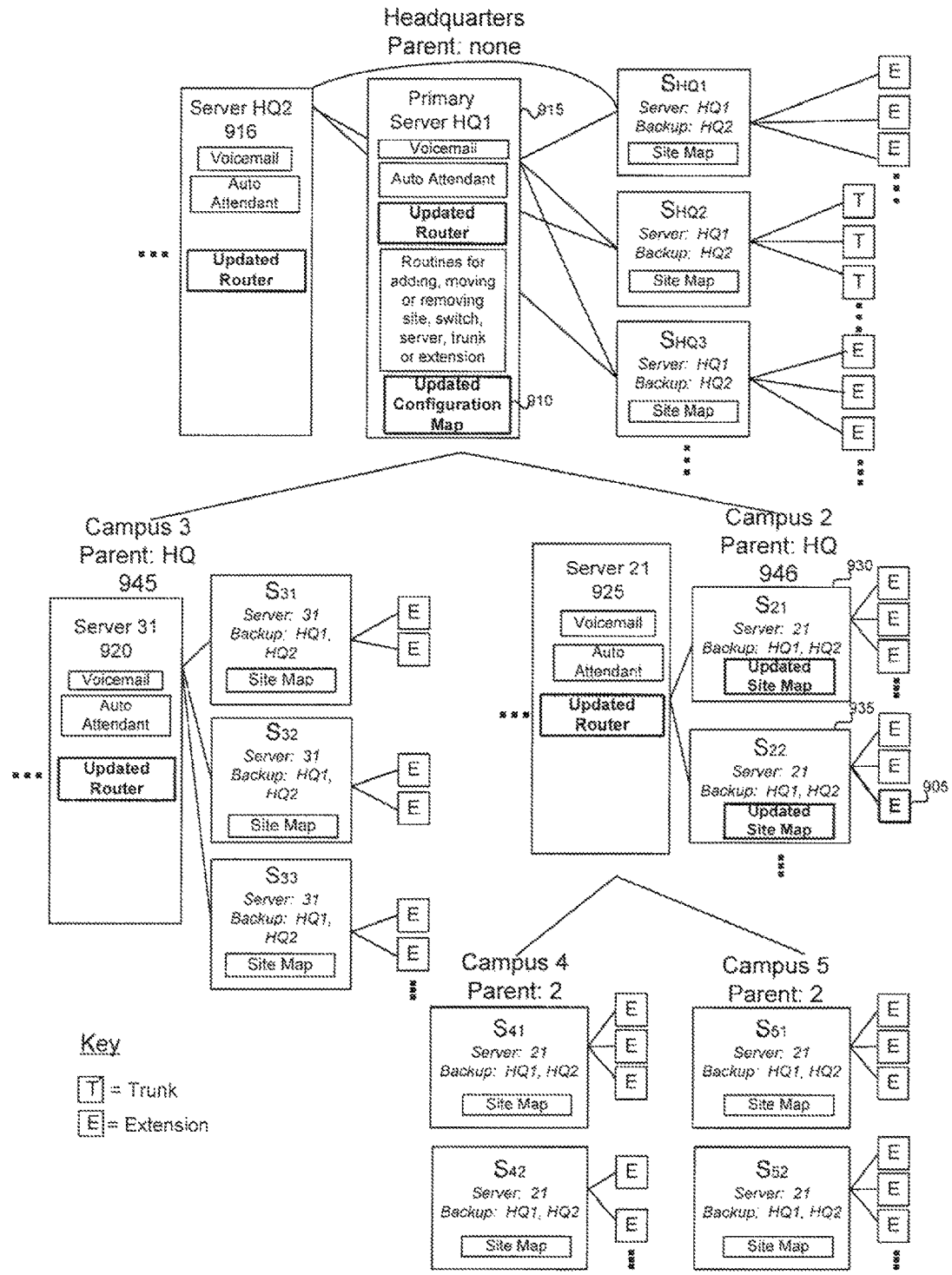
FIG. 9 is a diagram illustrating a sample addition of an extension to an IP telephony network.
Figure 24:
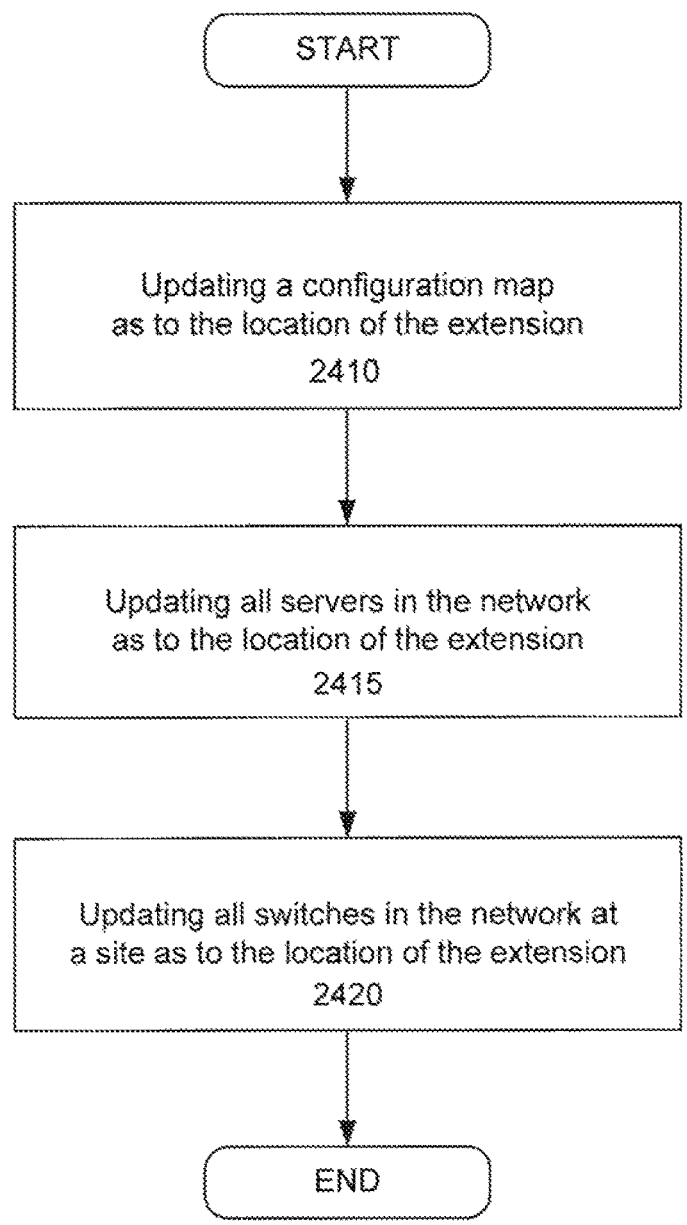
FIG. 24 is a flow diagram of a preferred method for adding an extension to an IP telephony network.

FIG. 9 illustrates a preferred embodiment and FIG. 24 a preferred method for adding an extension 905 to an IP telephony network. Referring to both FIGS. 9 and 24, a preferred method for adding an extension 905 to an IP telephony network begins by updating 2410 a configuration map 910 stored in a primary server 915 located at a headquarter site as to the location of the extension 905, updating 2415 all servers 915, 916, 920 and 925 in the network as to the location of the extension 905 added and updating 2420 all switches 930 and 935 at the site 946 ("Campus 2") in the network to which the extension 905 is added.

In a preferred embodiment, updating a server may be performed by updating a router located in the server. In general, the configuration map need not be stored in a primary server located at a headquarter site. It can be stored anywhere in the network, provided the other IP telephony elements have access to it. Moreover, not all servers or switches need be updated as to the location of the extension 905. (Nor does the deletion of an extension or the addition, removal or movement of a trunk, switch, server or site require updating of all switches and servers in the network.) However, as noted in the preceding paragraph, in a preferred embodiment, all servers in the network and all switches at the site to which the extension is added are updated because updating a greater number of servers and/or switches helps to minimize bottleneck when locating other IP telephony elements or providing services to the IP telephony elements. Moreover, updating a server and/or updating a switch helps to improve the robustness and reliability of the system. For example, if the connection to the headquarter site were down, the rest of the system could still function because the routers in the servers would contain most (if not all) of the information stored in the configuration map, which information is required to locate IP telephony elements and services in the network.

Updating a server in the network involves: (i) updating the server 925 associated with the extension 905, the location of the associated server 925 determined by consulting the configuration map 910 (or, in an alternative embodiment, the site map in the switch 935 to which the extension 905 is connected); or (ii) updating a server (e.g., 915, 916 or 920) other than a server associated with the extension 905, the location of the server may be determined from the configuration map 910 (or, in an alternative embodiment, a router in a server, such as the router in server 915).

In a preferred embodiment, updating 2420 a switch 930 or 935 at the site 946 involves updating a site map associated with the switch. The configuration map 910 (or, in an alternative embodiment, the site map for the switch 935 to which the extension 905 is connected) may be consulted in order to determine the location of the other switches 930 at the site 946 for purposes of updating 2420.

In addition, the configuration map 910 may also be used to determine a server in which to store a voicemail box associated with the extension 905. In such a case, the method of adding an extension 905 would further include determining from the configuration map 910 a server to host a voicemail box associated with the extension 905 by tracing the tree-like hierarchy, then storing the voicemail box at the server determined from the configuration map 910. An advantage of this method of determining a server in which to store the voicemail box is that tracing the tree-like hierarchy from a given location in the tree tends to identify IP telephony elements (including servers, switches, etc.) that are located at or nearby the site. Hence, the result is a more efficient use and allocation of IP telephony elements within the network.

Figure 10:
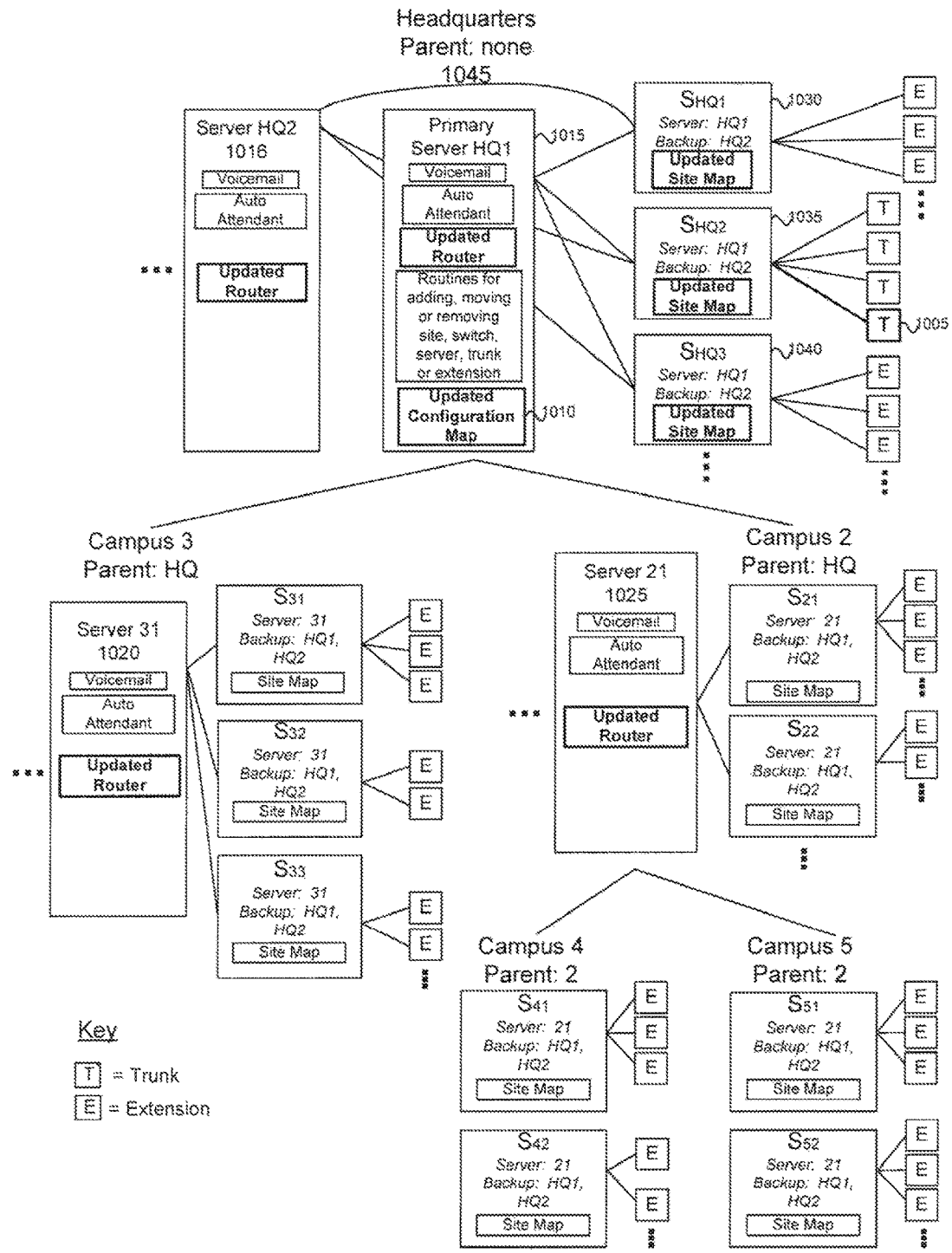
FIG. 10 is a diagram illustrating a sample addition of a trunk to an IP telephony network.
Figure 25:
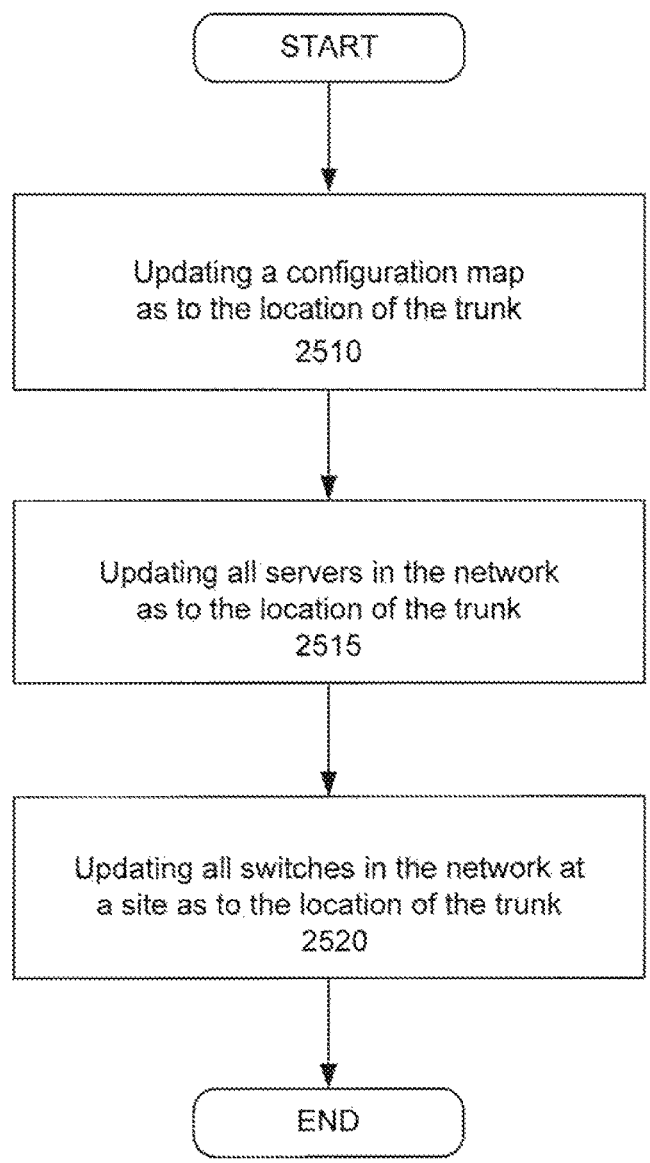
FIG. 25 is a flow diagram of a preferred method for adding a trunk to an IP telephony network.

FIG. 10 illustrates a preferred embodiment and FIG. 25 a preferred method for adding a trunk 1005 to an IP telephony network. Referring both to FIGS. 10 and 25, the preferred method includes the steps of updating 2510 a configuration map 1010 stored in a primary server 1015 located at a headquarter site as to the location of the trunk 1005, updating 2515 all servers 1015, 1016, 1020 and 1025 in the network as to the location of the trunk 1005 added and updating 2520 all switches 1030, 1035 and 1040 in the network at the site 1045 of the trunk 1005.

Updating a server in the network may involve updating a server associated with the trunk 1005 (in the embodiment shown in FIG. 10, server 1015), the location of the associated server 1015 determined by consulting the configuration map 1010 (or, in an alternative embodiment, the switch $S_{HQ2}$ 1035 to which the trunk 1005 is connected), or updating a server other than a server associated with the trunk 1005 (e.g., 1016, 1020 or 1025), the location of such other server determined from the configuration map 1010 (or, in an alternative embodiment, a router in a server, such the router in server 1016).

Figure 11:
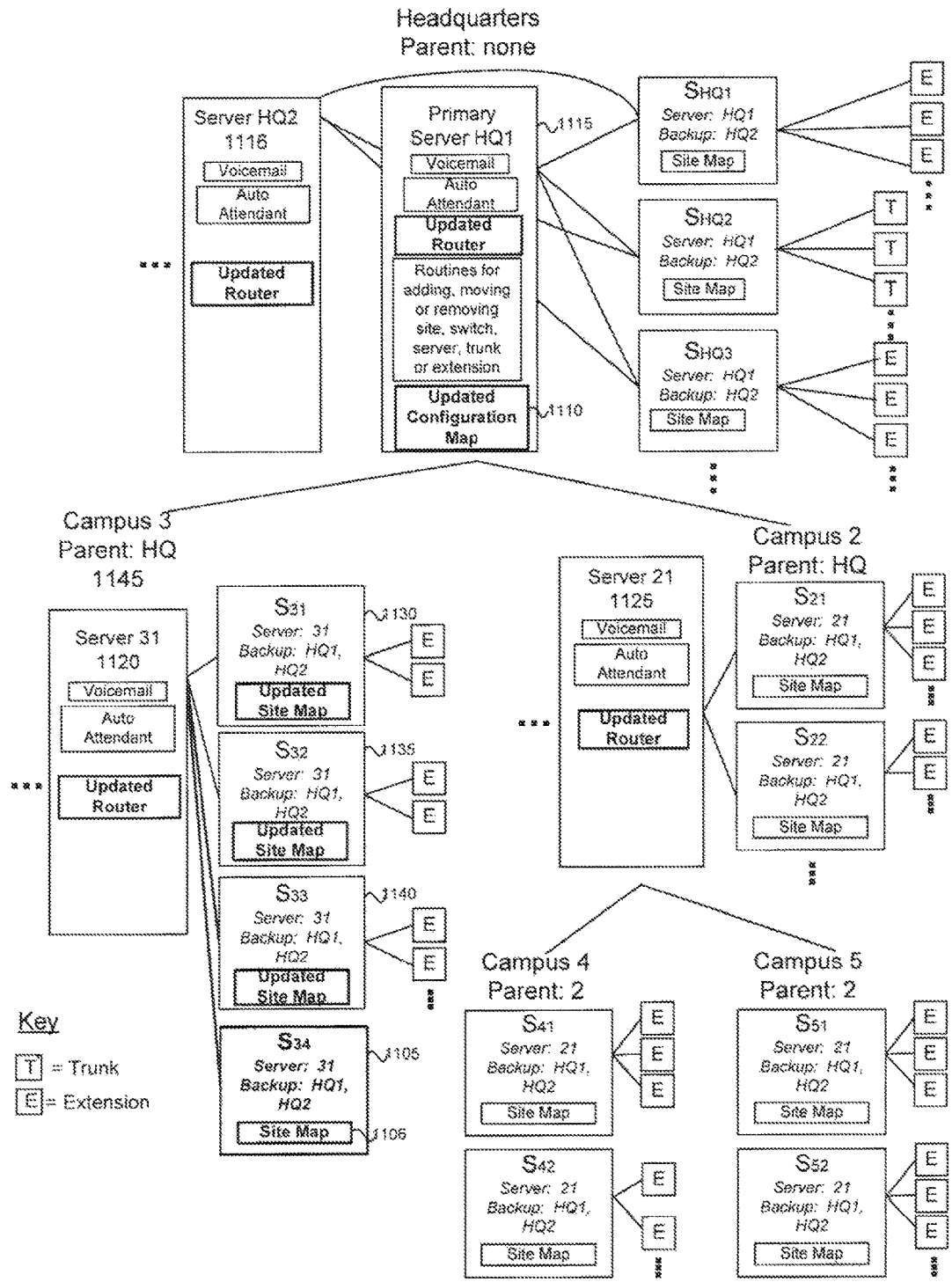
FIG. 11 is a diagram illustrating a sample addition of a switch to an IP telephony network.
Figure 26:
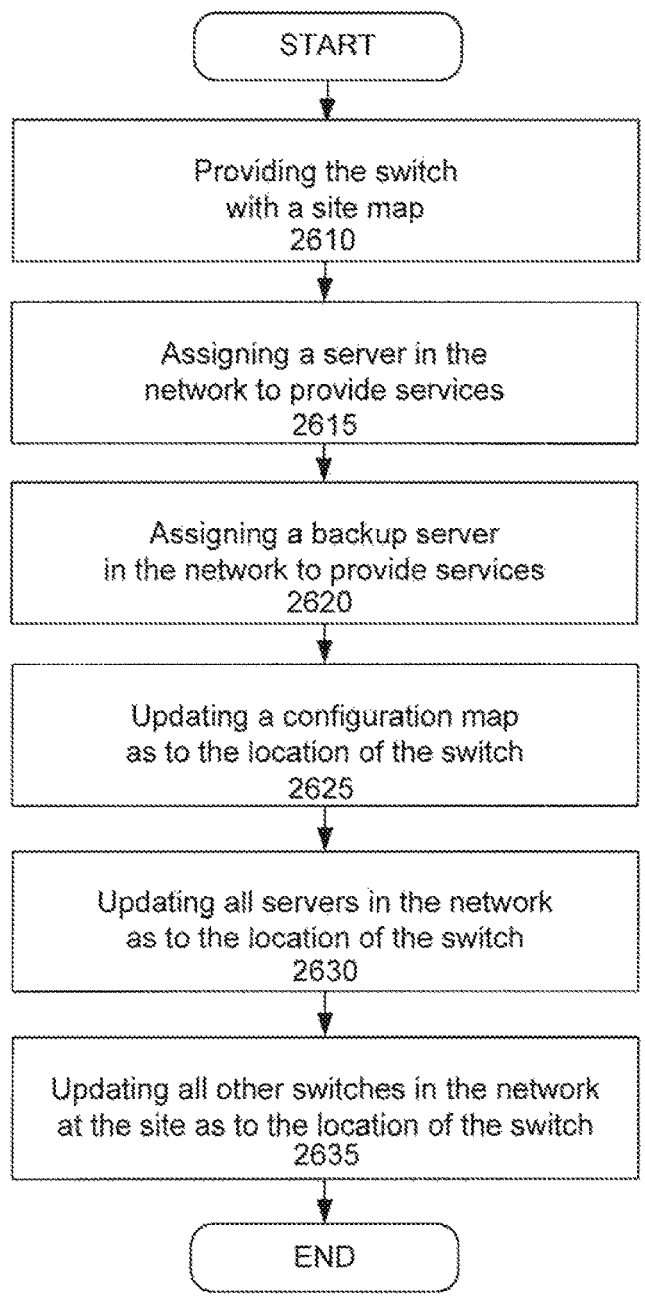
FIG. 26 is a flow diagram of a preferred method for adding a switch to an IP telephony network.

FIG. 11 shows a preferred embodiment and FIG. 26 a preferred method for adding a switch 1105 to an IP telephony network. As shown in FIGS. 11 and 26, a switch 1105 can be added to the network by providing 2610 the switch 1105 with a site map 1106, assigning 2615 a server in the network to provide services to the switch 1105 (as shown in FIG. 11, server 31 is assigned as server to switch $S_{34}$), assigning 2620 a backup server to provide services to the switch 1105 (as shown in FIG. 1, servers HQ1 and HQ2 are assigned as backup servers), updating 2625 a configuration map 1110 stored in a primary server 1115 located at a headquarter site, updating 2630 all servers 1115, 1116, 1120 and 1125 in the network as to the location of the switch 1105 added and updating 2635 all switches 1130, 1135 and 1140 in the network at the site 1145 of the switch 1105. In a preferred embodiment, all site maps at a site are the same, and switches and servers have IP addresses that are stored in the configuration map 1110 and the site maps.

Figure 27:
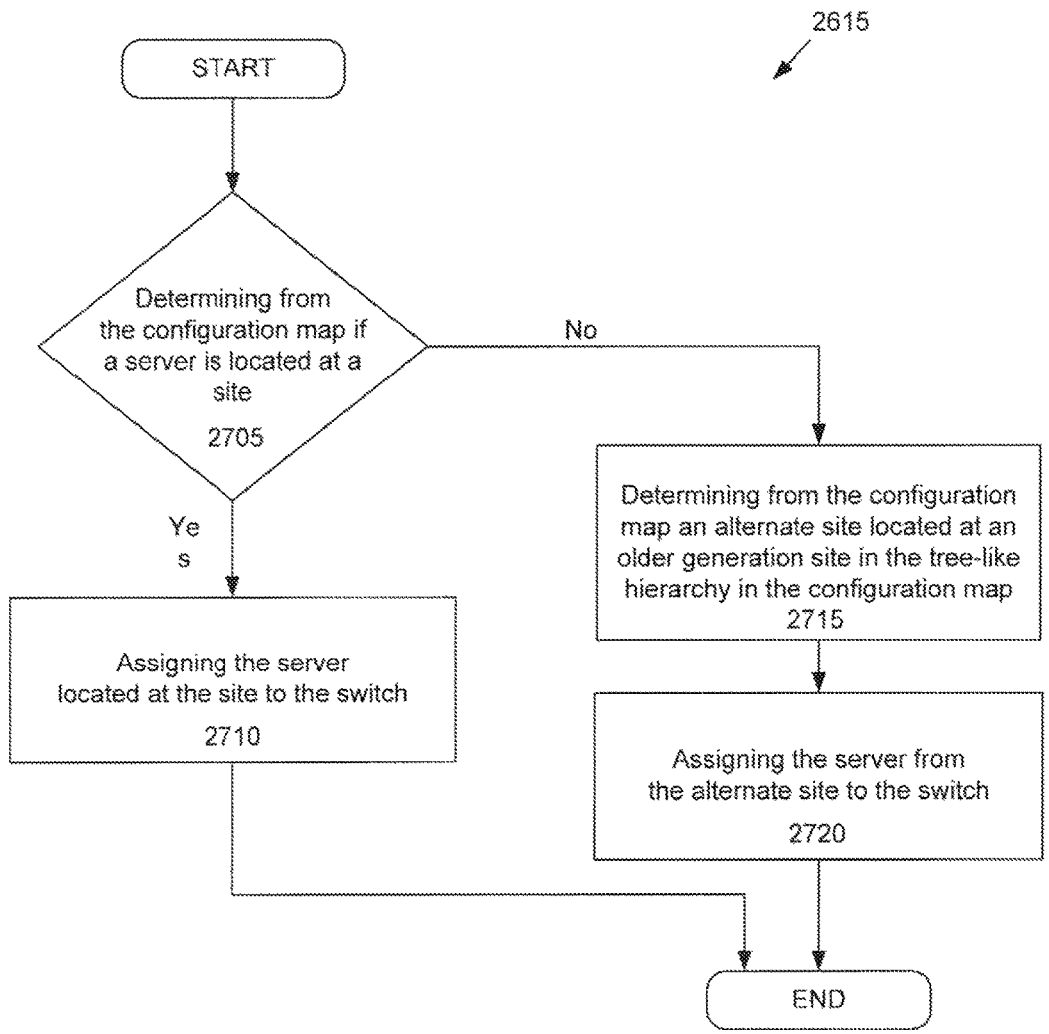
FIG. 27 is a flow diagram of a preferred method for assigning a server to provide services to a switch.

FIG. 27 illustrates a preferred method for assigning 2615 a server to provide services to a switch involving determining 2705 from the configuration map 1110 (or, in an alternative embodiment, the site map for the switch) if a server is located at the site. If the IP telephony network 100 determines that a server is located at the site, the IP telephony network 100 assigns 2710 the server located at the site to provide services to the switch. If the IP telephony network 100 determines that a server is not located at the site, the IP telephony network 100 determines 2715 from the configuration map (or, in an alternative embodiment, from any router in a server) an alternate site located at an older generation site by tracing the tree-like hierarchy, then assigns 2720 the server from the alternate site to the switch. In a preferred embodiment, assigning 2710 and 2720 a server to a switch involves storing information about the server in the memory of the switch so that the switch can access the server and services provided by such server.

For example, referring to FIG. 11, the server assigned to switch $S_{34}$ 1105 is server 31 1120 since server 31 1120 is located at the same site 1145 as switch $S_{34}$ 1105. If, however, there were no servers at the site 1145 of switch $S_{34}$ (i.e., "Campus 3"), then the server assigned to switch $S_{34}$ 1105 would be a server located at an older generation site relative to Campus 3, in this case either servers HQ1 or HQ2. Servers HQ1 and HQ2 are found by tracing the tree-like hierarchy in the configuration map or by consulting a router in a server in the network 100.

Figure 12:
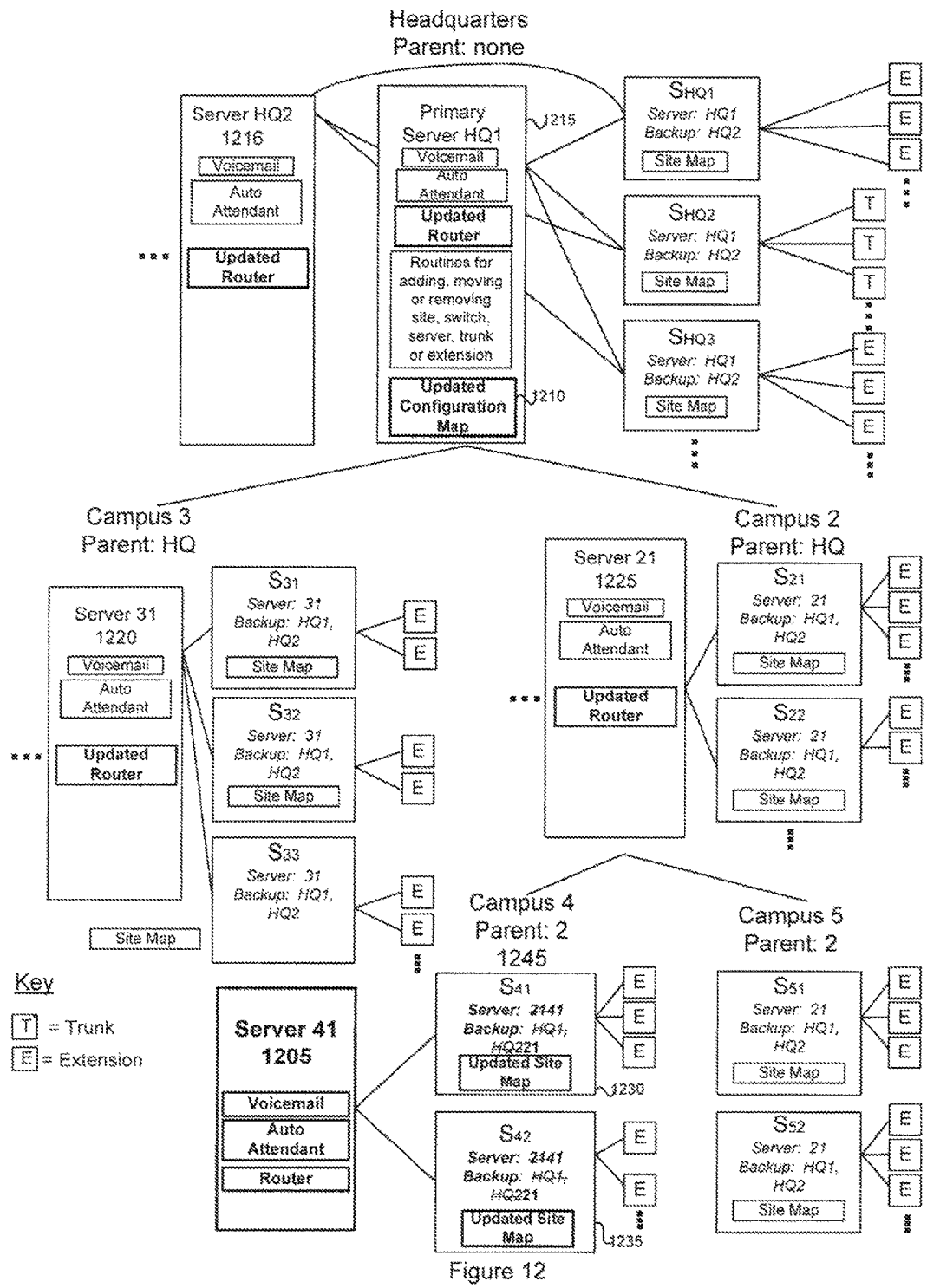
FIG. 12 is a diagram illustrating a sample addition of a server to an IP telephony network.
Figure 28:
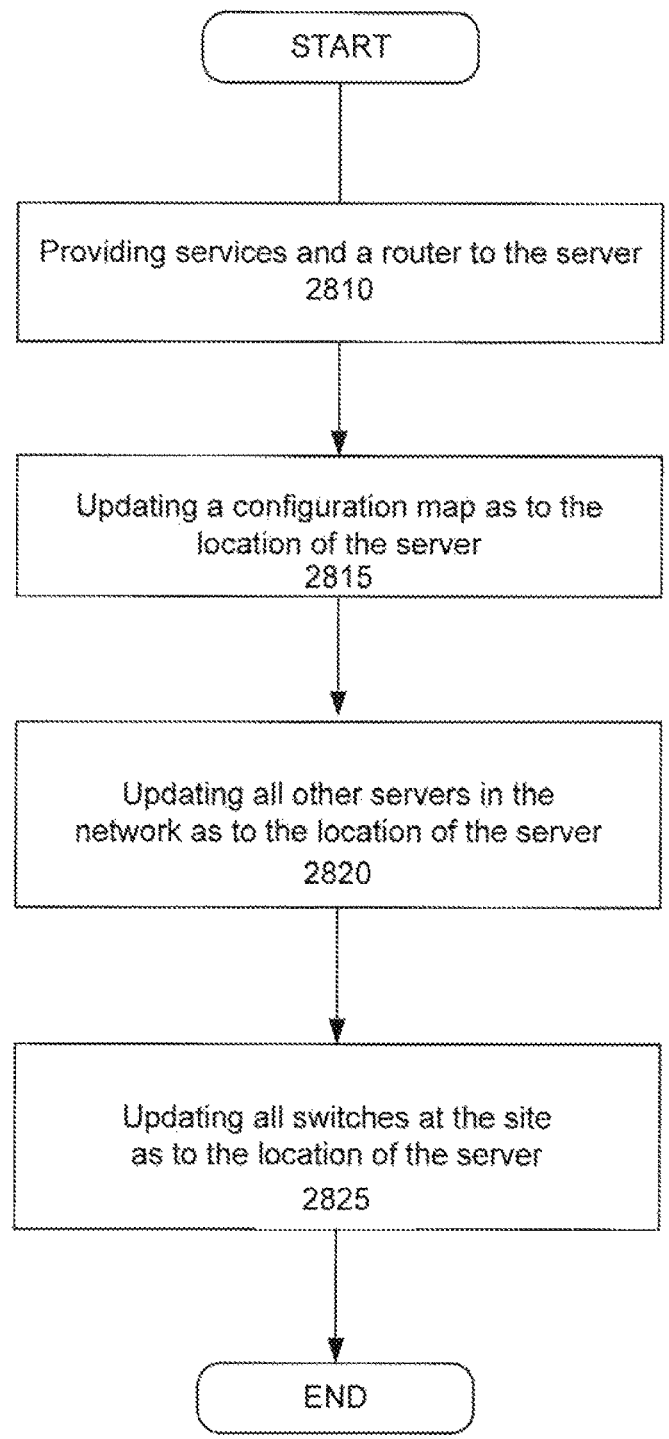
FIG. 28 is a flow diagram of a preferred method for adding a server to an IP telephony network.

FIG. 12 shows a preferred embodiment and FIG. 28 a preferred method for adding a server 1205 to an IP telephony network by providing 2810 services and a router to the server 1205, updating 2815 a configuration map 1210 as to the location of the server 1205, updating 2820 all other servers 1215, 1216, 1220 and 1225 in the network as to the location of the server 1205 and updating 2825 all switches 1230 and 1235 at the site 1245 as to the location of the server 1205, including site maps and server and backup server assignments associated with the switches 1230 and 1235. The router provided 2810 to the server 1205 is identical to the router contained in the other servers 1215, 1216, 1220 and 1225 in the network. Referring to FIG. 12, if Campus 4 1245 has connected to it younger generation sites, the IP telephony elements in these sites may need to be updated to reflect the addition of the server 1205, particularly if these younger generation sites do not have servers at their own sites.

Figure 13:
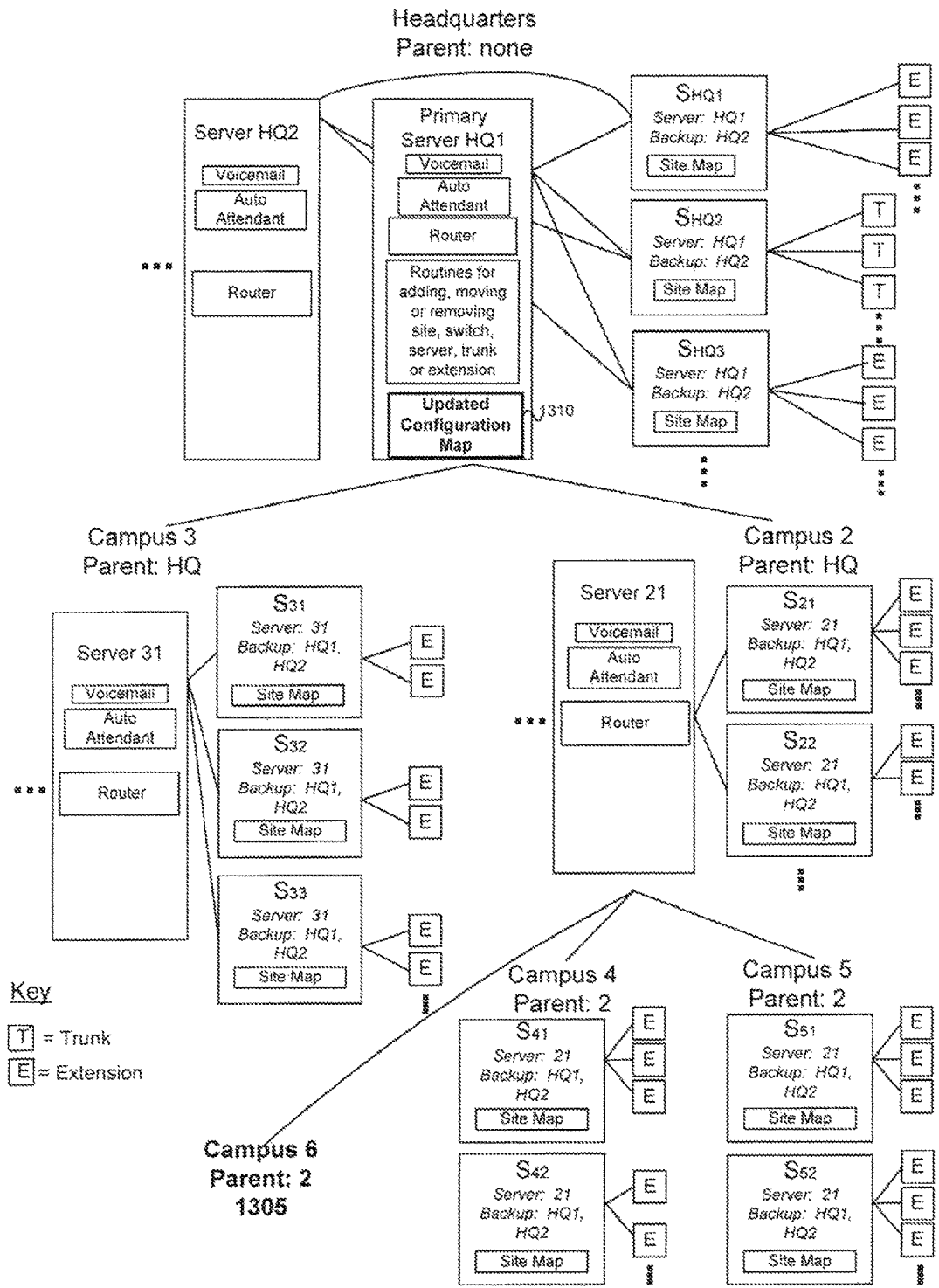
FIG. 13 is a diagram illustrating a sample addition of a site to an IP telephony network.
Figure 29:
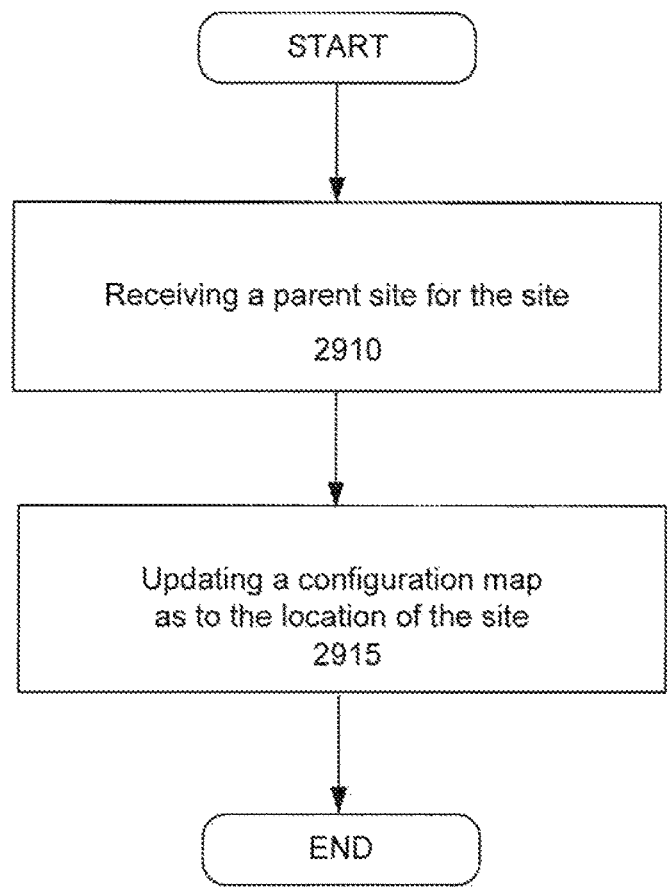
FIG. 29 is a flow diagram of a preferred method for adding a site to an IP telephony network.

FIG. 13 illustrates a preferred embodiment and FIG. 29 a preferred method for adding a site 1305 to an IP telephony network. Referring to FIGS. 13 and 29, the preferred method begins by receiving 2910 a parent site for the site 1305 from the system administrator or other source and updating 2915 a configuration map 1310 as to the location of the site 1305. The location of the site 1305 is determined from the parent site provided by the system administrator. If site 1305 were added as a child of Campus 2 and the parent of Campus 5, then the parent information for Campus 5 would need to be updated to reflect site 1305 as the new parent site.

Figure 14:
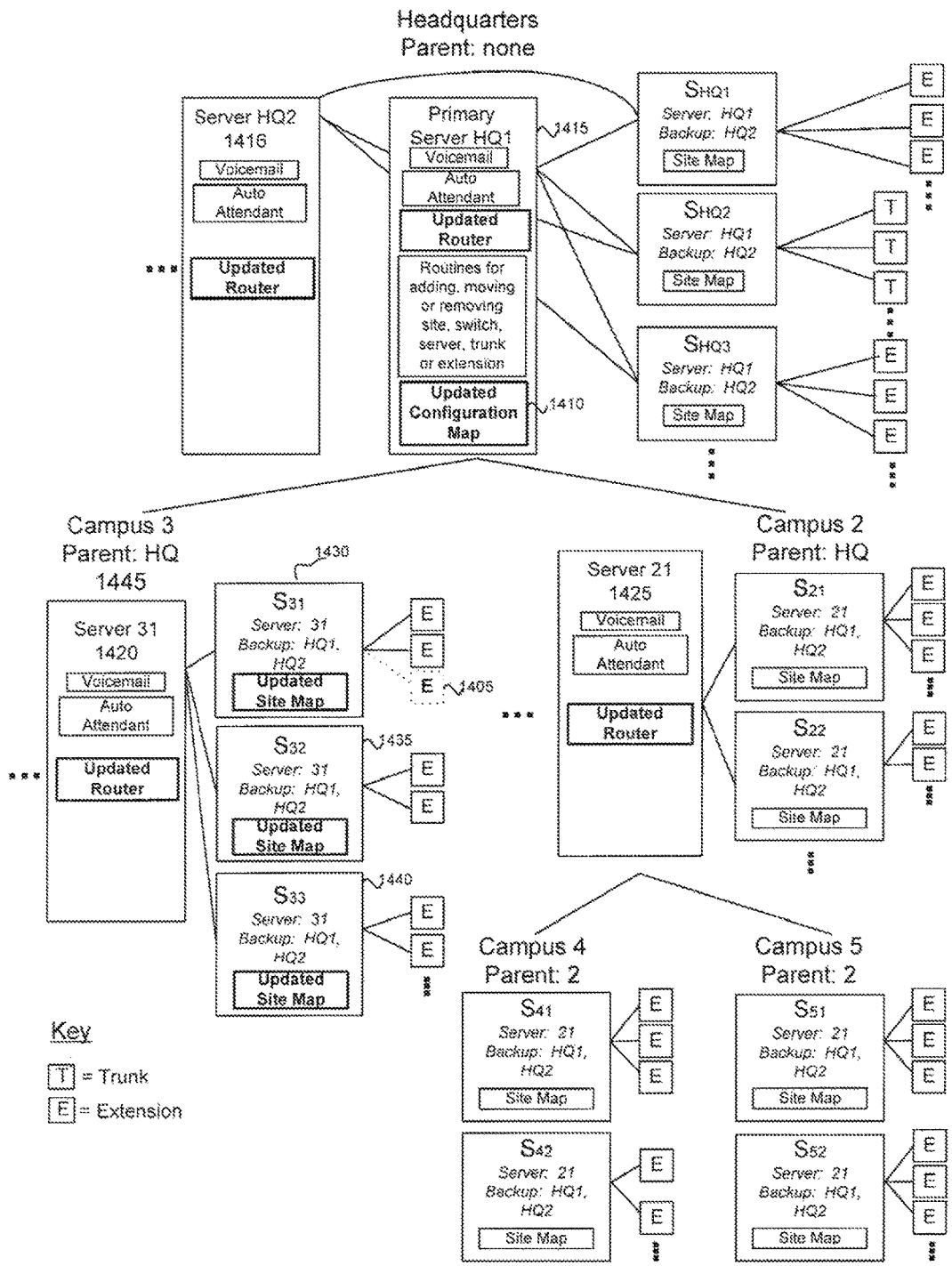
FIG. 14 is a diagram illustrating a sample removal of an extension from an IP telephony network.
Figure 30:
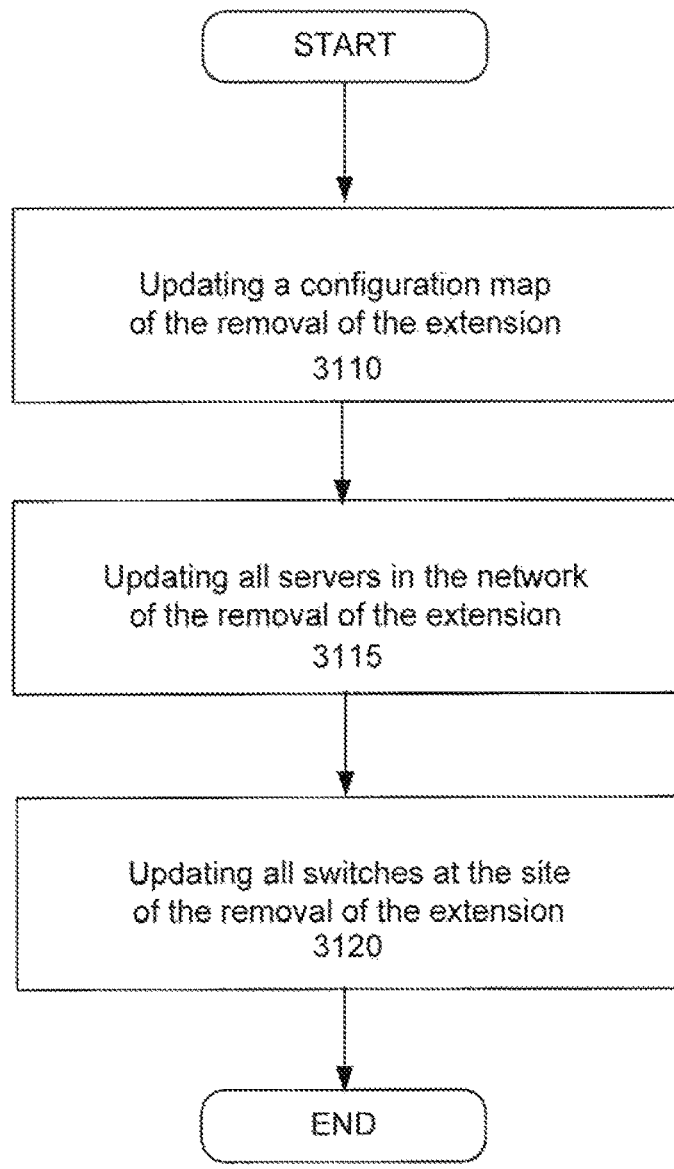
FIG. 30 is a flow diagram of a preferred method for removing an extension from an IP telephony network.

FIG. 14 shows a preferred embodiment and FIG. 30 a preferred method for removing an extension 1405 from an IP telephony network by updating 3110 a configuration map 1410 of the removal of the extension 1405, updating 3115 all servers 1415, 1416, 1420 and 1425 in the network of the removal of the extension 1405 and updating 3120 all switches 1430, 1435 and 1440 at the site 1445 of the removal of the extension 1405.

Figure 15:
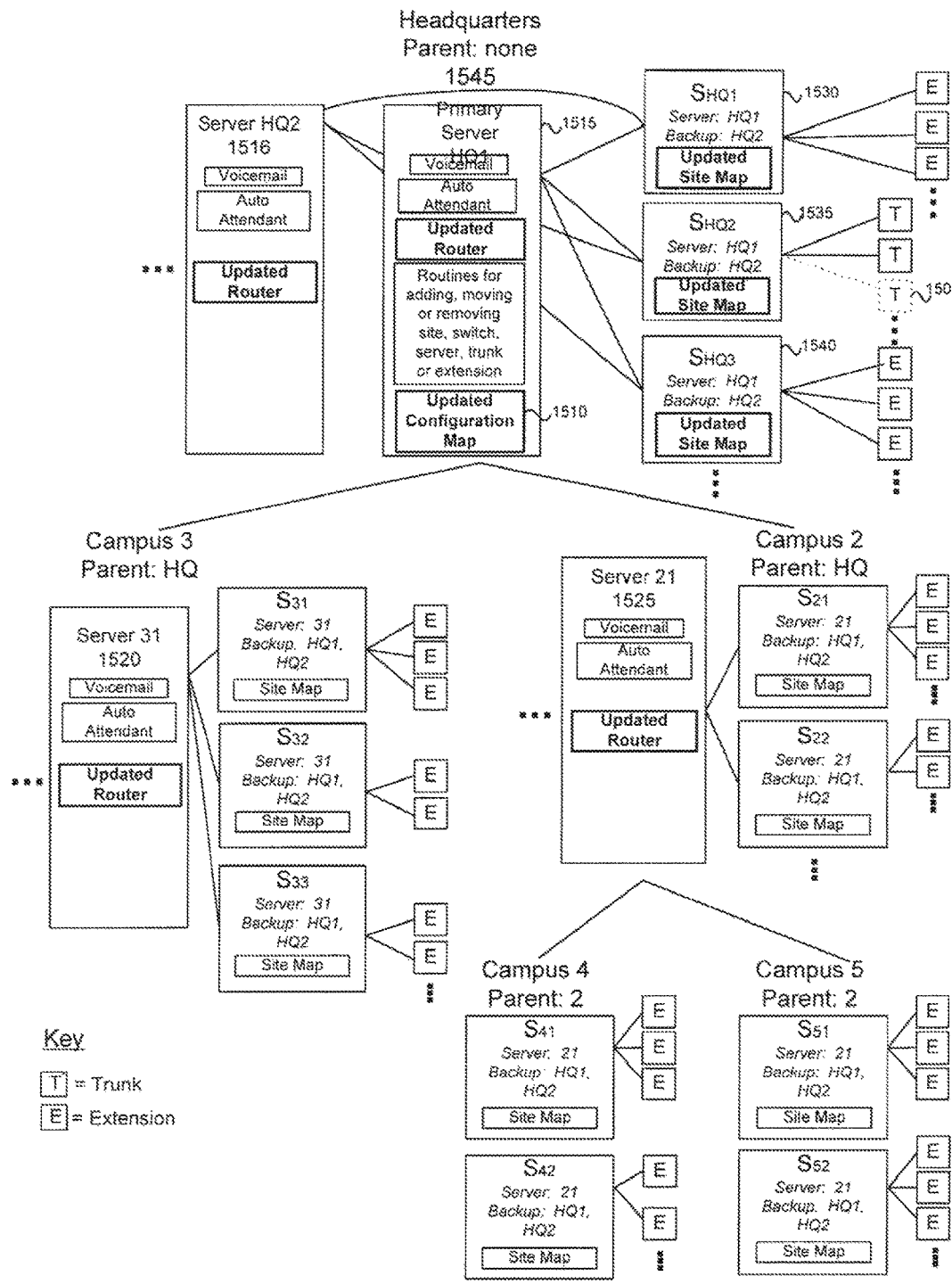
FIG. 15 is a diagram illustrating a sample removal of a trunk from an IP telephony network.
Figure 31:
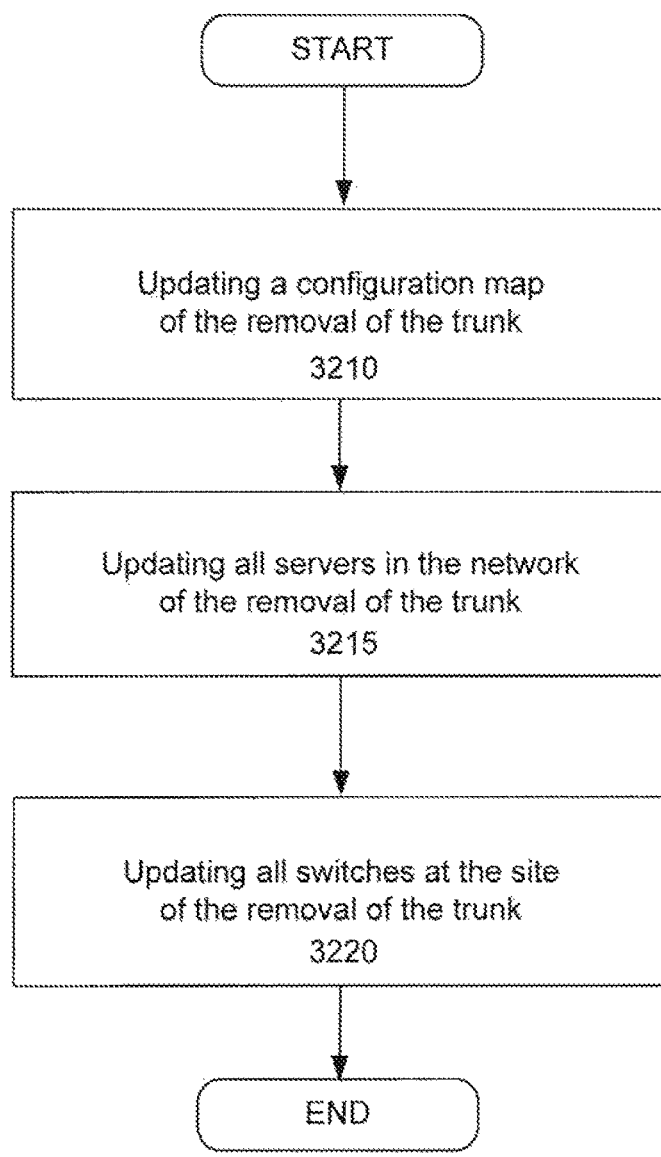
FIG. 31 is a flow diagram of a preferred method for removing a trunk from an IP telephony network.

FIG. 15 illustrates a preferred embodiment and FIG. 31 a preferred method for removing a trunk 1505 from an IP telephony network by updating 3210 a configuration map 1510 of the removal of the trunk 1505, updating 3215 all servers 1515, 1516, 1520 and 1525 in the network of the removal of the trunk 1505 and updating 3220 all switches 1530, 1535 and 1540 at the site 1545 ("Headquarters") of the removal of the trunk 1505.

Figure 16:
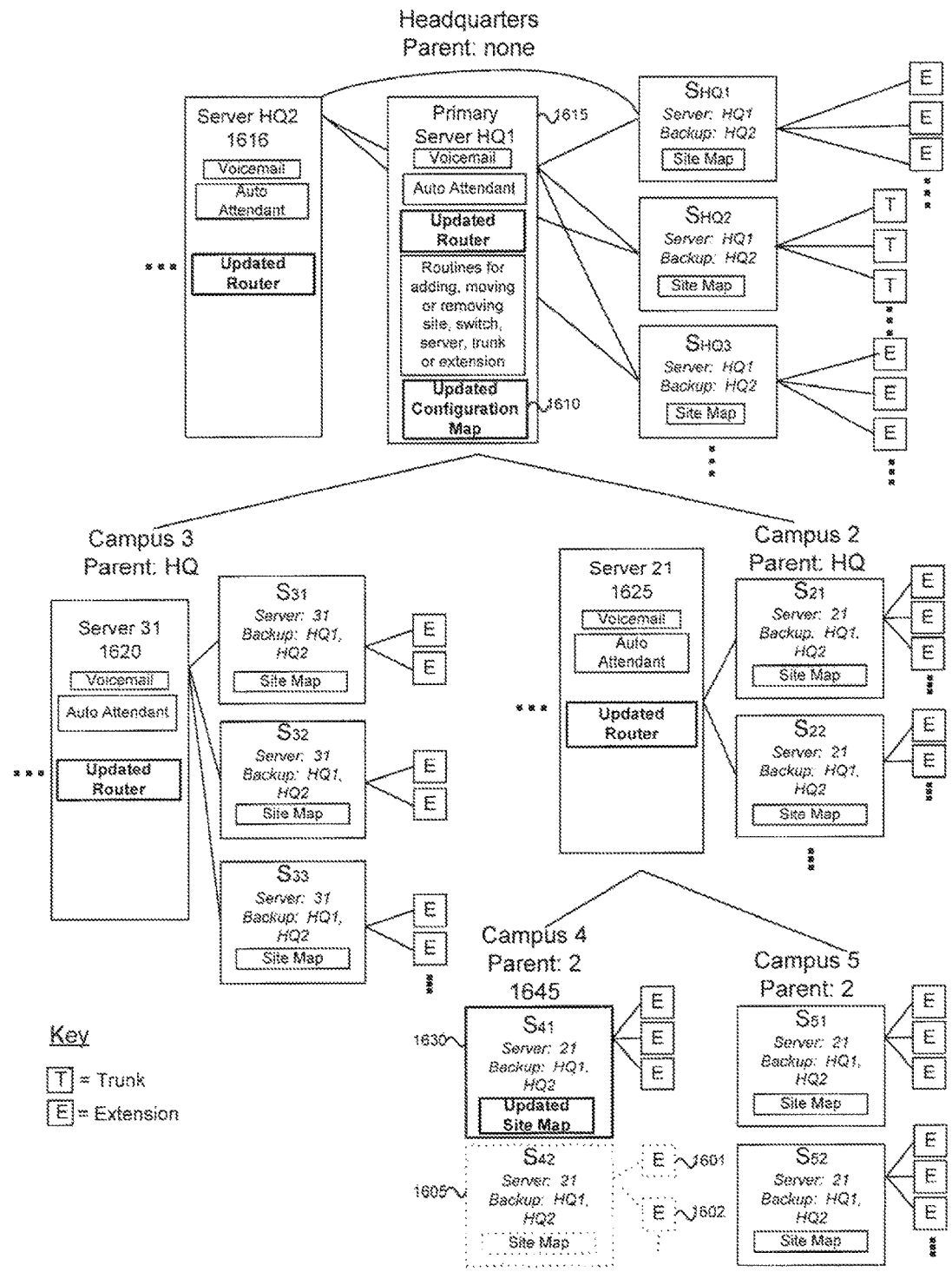
FIG. 16 is a diagram illustrating a sample removal of a switch from an IP telephony network.
Figure 32:
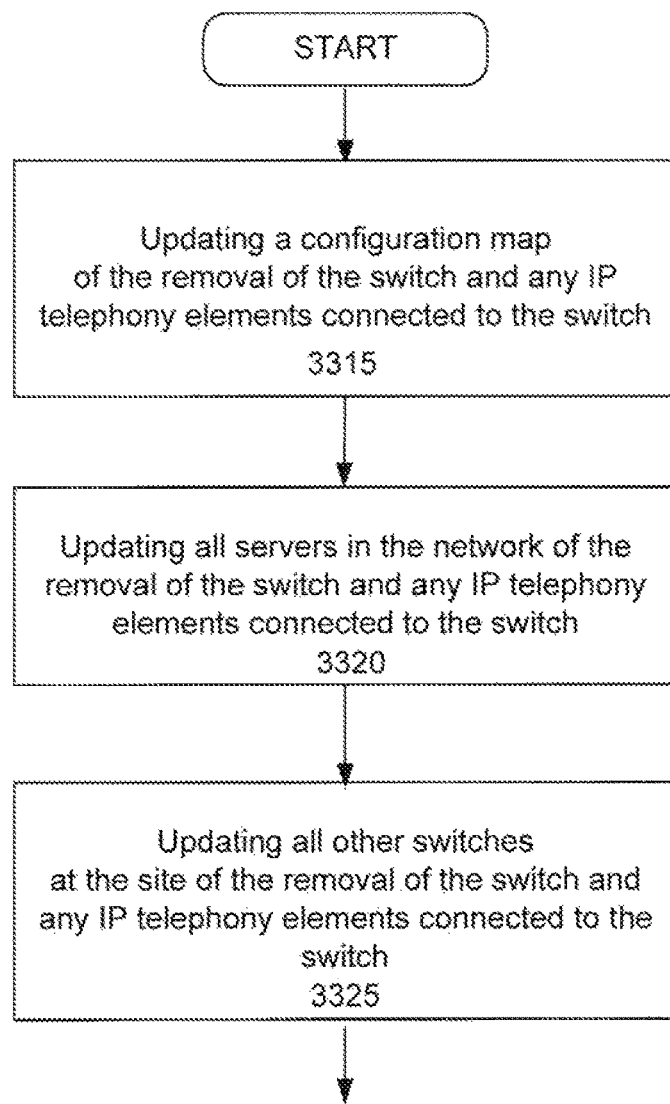
FIG. 32 is a flow diagram of a preferred method for removing a switch from an IP telephony network.

FIG. 16 shows a preferred embodiment and FIG. 32 a preferred method for removing a switch 1605 from an IP telephony network. Referring to both FIGS. 16 and 33, the preferred method begins by updating 3315 a configuration map 1610 of the removal of the switch 1605 and any IP telephony elements connected to the switch (e.g., extensions 1601 and 1602), updating 3320 all servers 1615, 1616, 1620 and 1625 in the network of the removal of the switch 1605 and any IP telephony elements connected to the switch and updating 3325 all other switches (as shown in FIG. 16, only switch $S_{41}$ 1630) at the site 1645 of the removal of the switch 1605 and any IP telephony elements connected to the switch.

Figure 17:
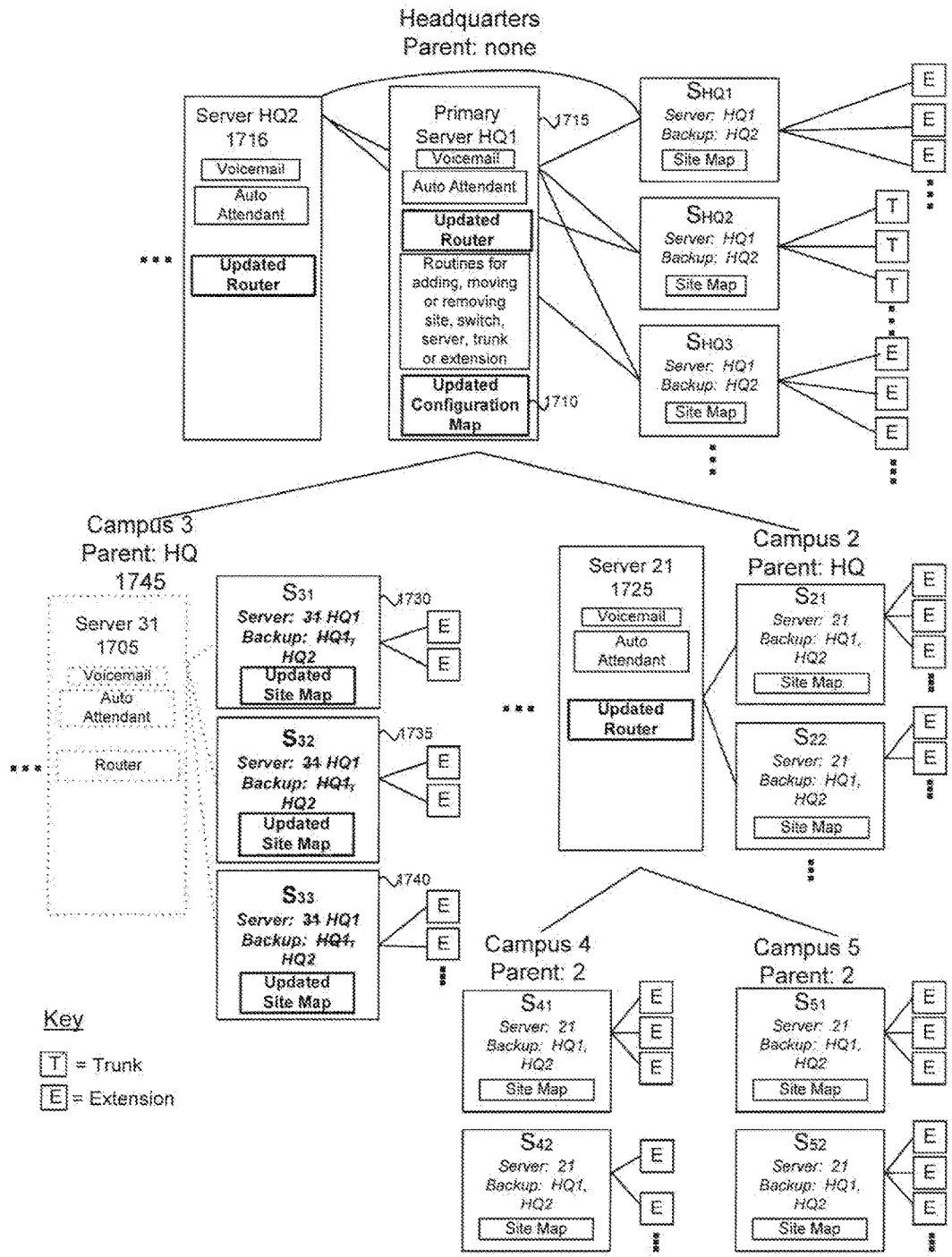
FIG. 17 is a diagram illustrating a sample removal of a server from an IP telephony network.
Figure 33:
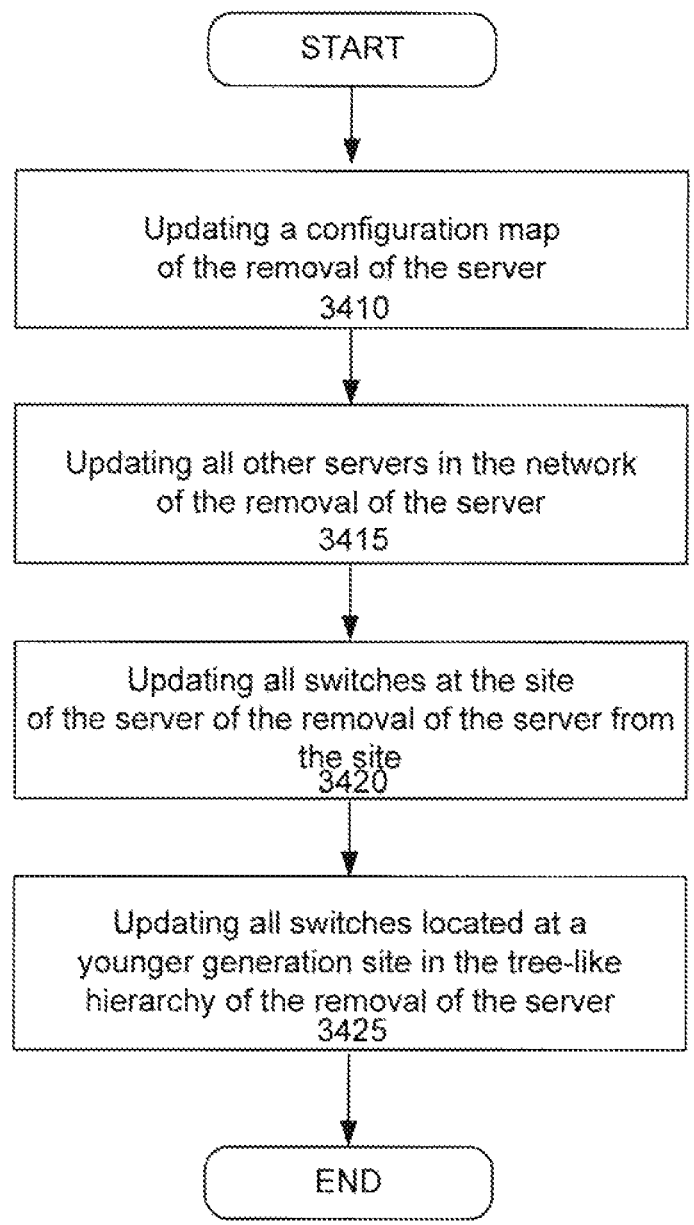
FIG. 33 removing a server from an IP telephony network.
Figure 34:
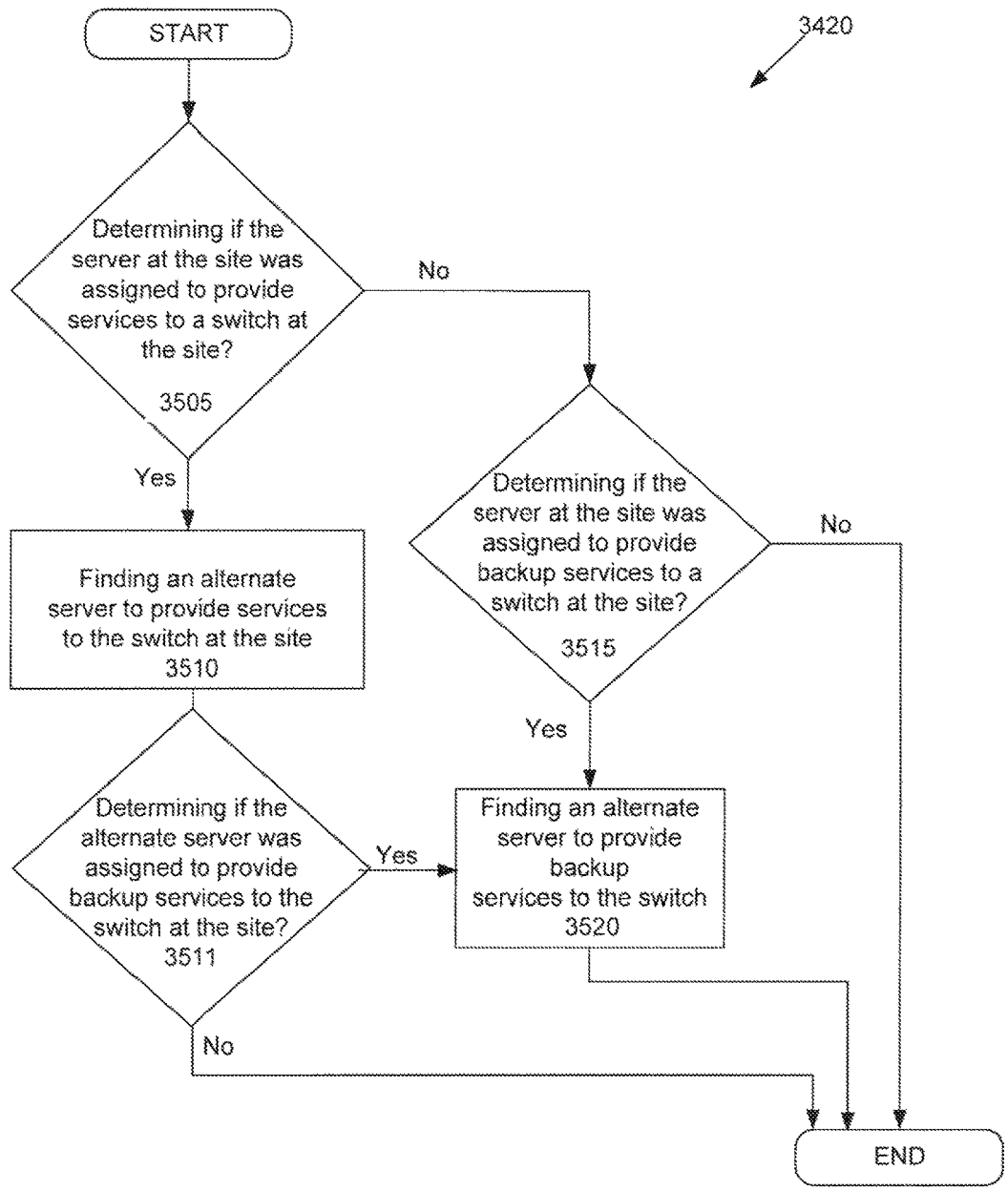
FIG. 34 is a flow diagram of a preferred method for updating a switch at the site of the removal of the server at the site.

FIG. 17 illustrates a preferred embodiment and FIG. 33 a preferred method for removing a server 1705 from an IP telephony network. Referring both to FIGS. 17 and 34, the preferred method begins by updating 3410 a configuration map 1710 of the removal of the server 1705, updating 3415 all other servers 1715, 1716 and 1725 in the network of the removal of the server 1705, updating 3420 all switches 1730, 1735 and 1740 at the site 1745 of the removal of the server 1705 and updating 3425 all switches located at a younger generation site in the tree-like hierarchy of the removal of the server 1705. In a preferred embodiment updating a switch involves updating the site map, server and backup server associated with the site.

FIG. 34 illustrates a preferred method for updating a switch at a site of the removal of a server from the site by determining 3505 if the server was assigned to provide services to the switch. If the server was assigned to provide services to the switch, the IP telephony network 100 finds 3510 an alternate server to provide services to the switch and determines 3511 if the found alternate server was assigned to provide backup services to the switch at the site. If the found alternate server was assigned to provide backup services to the switch, the IP telephony network 100 finds 3520 an alternate server to provide backup services to the switch.

If the server was not assigned to provide services to the switch, the IP telephony network 100 determines 3515 if the server at the site was assigned to provide backup services to the switch at the site. If the server was assigned to provide backup services to the switch, the IP telephony network 100 finds 3520 an alternate server to provide backup services to the switch. In order to update a switch at the site, a site map associated with any of the switches at the site, a configuration map or a router in any server in the network may be used to locate each switch in the site for updating.

Figure 35:
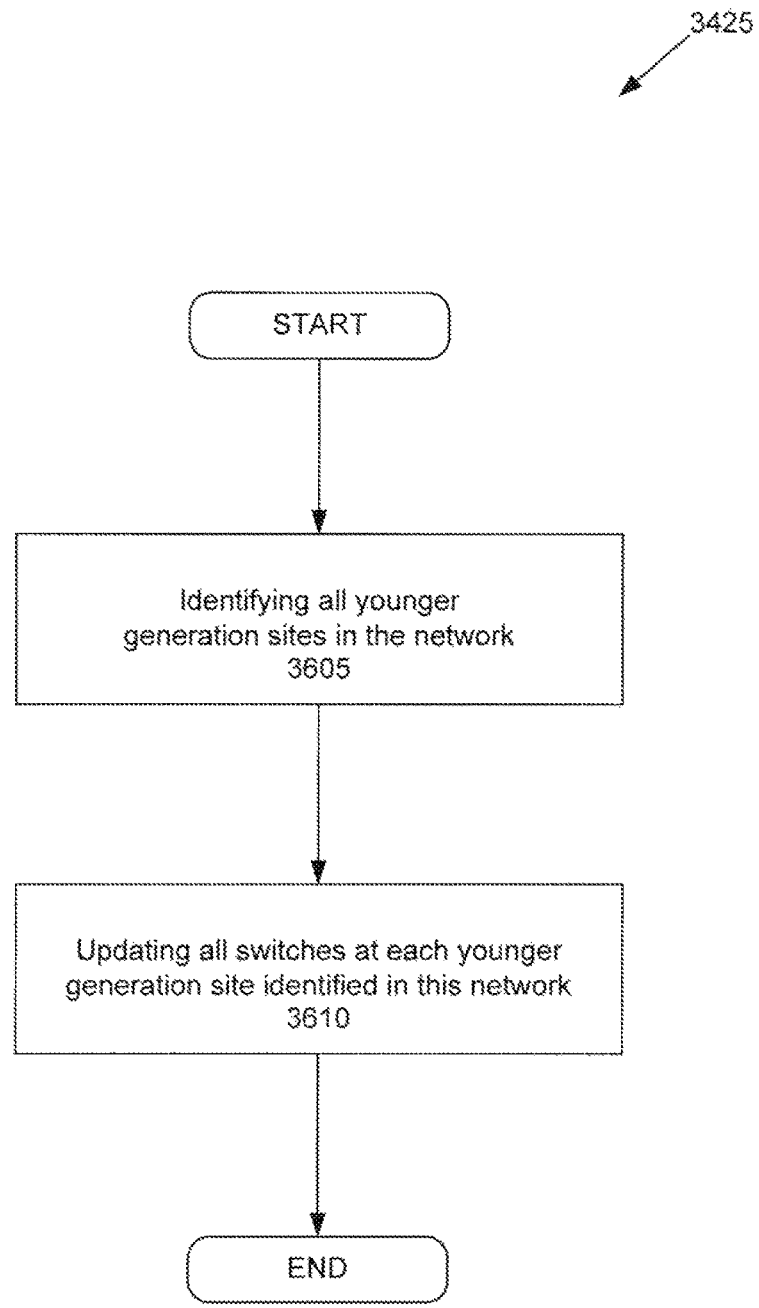
FIG. 35 is a flow diagram of a preferred method for updating all switches at a younger generation site of the removal of the server.

FIG. 35 illustrates a preferred embodiment for updating 3425 switches located at a younger generation site in the tree-like hierarchy of the removal of the server by identifying 3605 all younger generation sites in the network by referring to the configuration map 1710, and updating 3610 the switches and their associated servers and backup servers located at each identified younger generation site.

Figure 36:
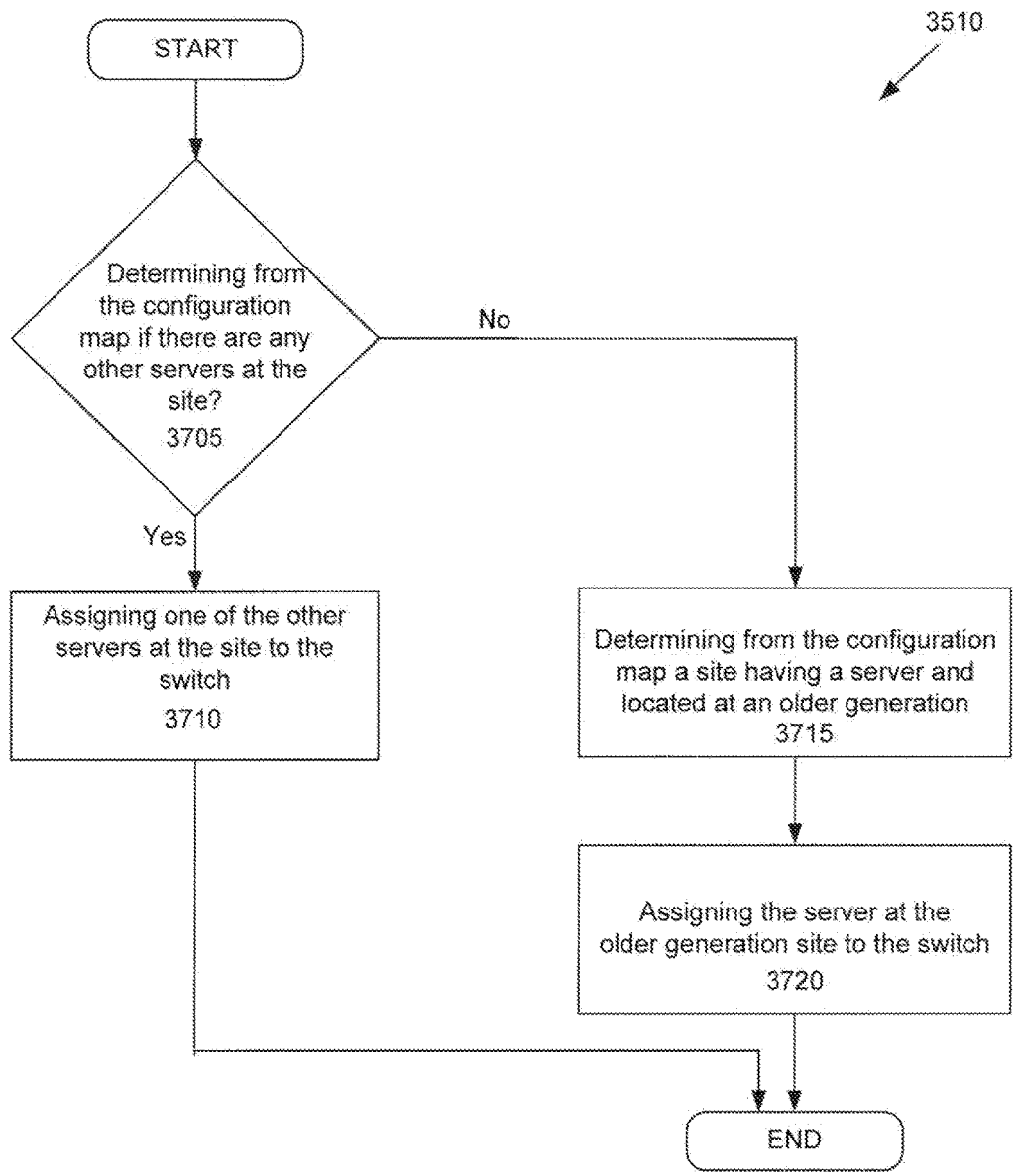
FIG. 36 is a flow diagram of a preferred method for finding an alternate server to provide services to the switch.

FIG. 36 illustrates a preferred method for finding 3510 (or 3520) an alternate server to provide services (or backup services) to a switch by determining 3705 from the configuration map 1710 (or, in an alternative embodiment, a switch) if there are any other servers at the site. If the IP telephony network 100 determines 3705 that there are other servers at the site, the IP telephony network 100 assigns 3710 one of the other servers at the site to the switch. If the IP telephony network 100 determines 3705 there is more than one server at the site, the network 100 uses any algorithm known in the art to select one of the servers including random selection or selection based upon server load. If no other servers are at the site, the IP telephony network 100 determines 3715 from the configuration map 1710 the closest older generation site having a server by tracing the tree-like hierarchy, then assigns 3720 the server at the older generation site to the switch.

For example, as shown in FIG. 17, Campus 3 1745 has no other servers after removal of server 31 1705. Hence, to find an alternate server, the IP telephony network 100 traces the tree-like hierarchy in the configuration map and finds servers HQ1 and HQ2 at the headquarter site, which servers are then assigned to switches $S_{31}$, $S_{32}$ and $S_{33}$.

Figure 18:
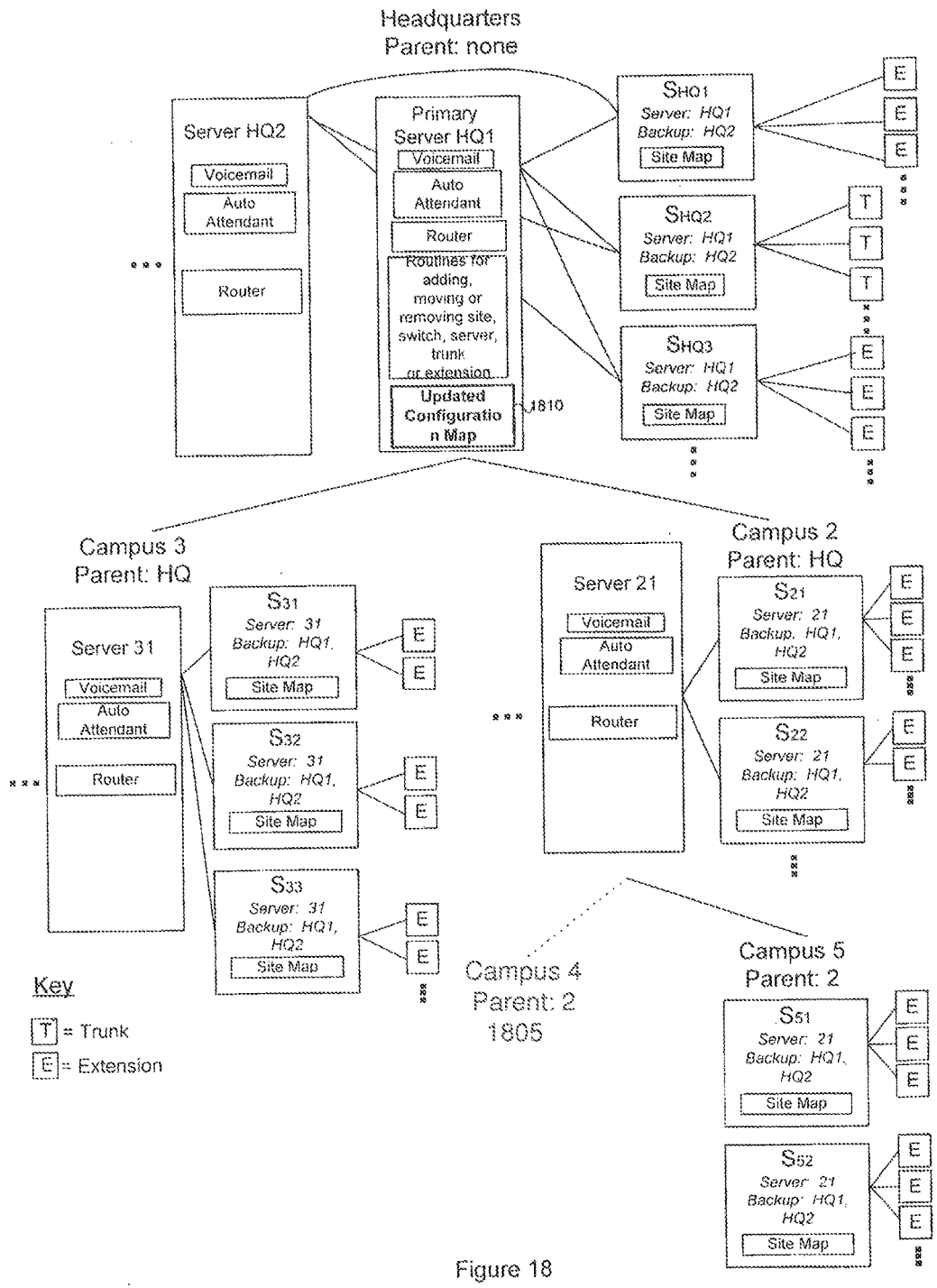
FIG. 18 is a diagram illustrating a sample removal of a site from an IP telephony network.
Figure 37:
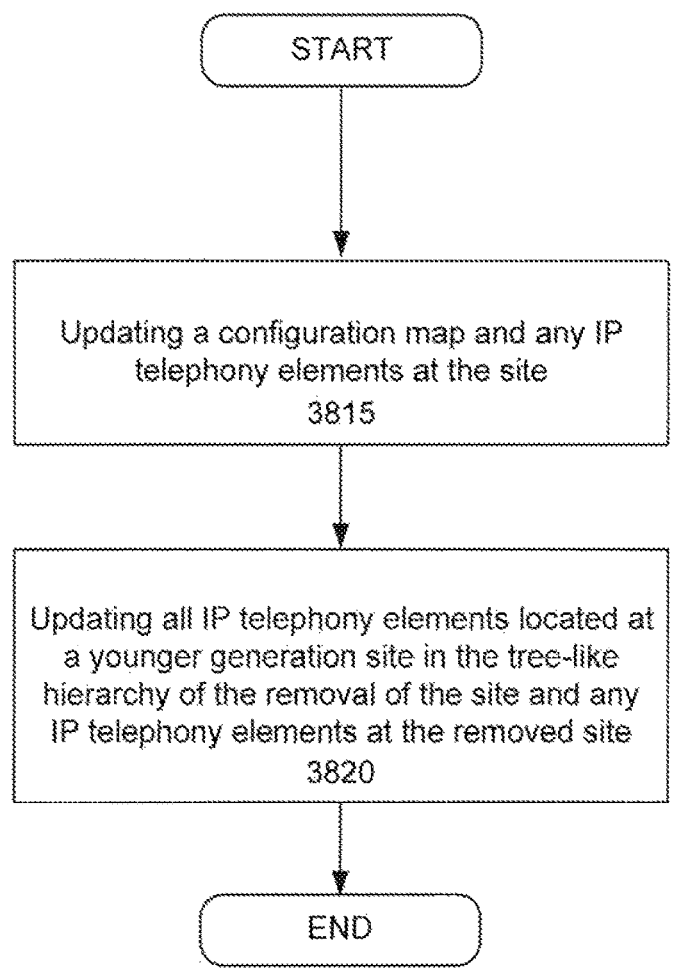
FIG. 37 is a flow diagram of a preferred method for removing a site from an IP telephony network.

FIG. 18 illustrates a preferred embodiment and FIG. 37 a preferred method for removing a site 1805 from an IP telephony network. The preferred method for removing a site 1805 from the network begins by updating 3815 a configuration map 1810 of the removal of the site 1805 and any IP telephony elements at the site 1805 and updating 3820 IP telephony elements (including sites along with their assigned parent site, servers and switches) located at a younger generation in the tree-like hierarchy of the removal of the site 1805 and any IP telephony elements at the site 1805. Depending up the location of the younger generation site and whether, among other things, such sites relied upon the servers at the removed site 1805, updating 3820 may require updates to the servers only or to servers, switches and/or sites.

For example, referring to FIG. 18, if Campus 4, the removed site, had a child site called "Campus 6," then the parent site for Campus 6 would need to be changed from Campus 4 to Campus 2. Similarly, if Campus 6 had no servers, but relied on a server at Campus 4, then the server associated with switches at Campus 6 would have to be changed to other servers at a different site, in this case at Campus 2 and/or the headquarter site. The IP telephony network 100 of the present invention traces the tree-like hierarchy in the configuration map 1810 in order to determine which servers to assign to the switches at Campus 6.

Figure 19:
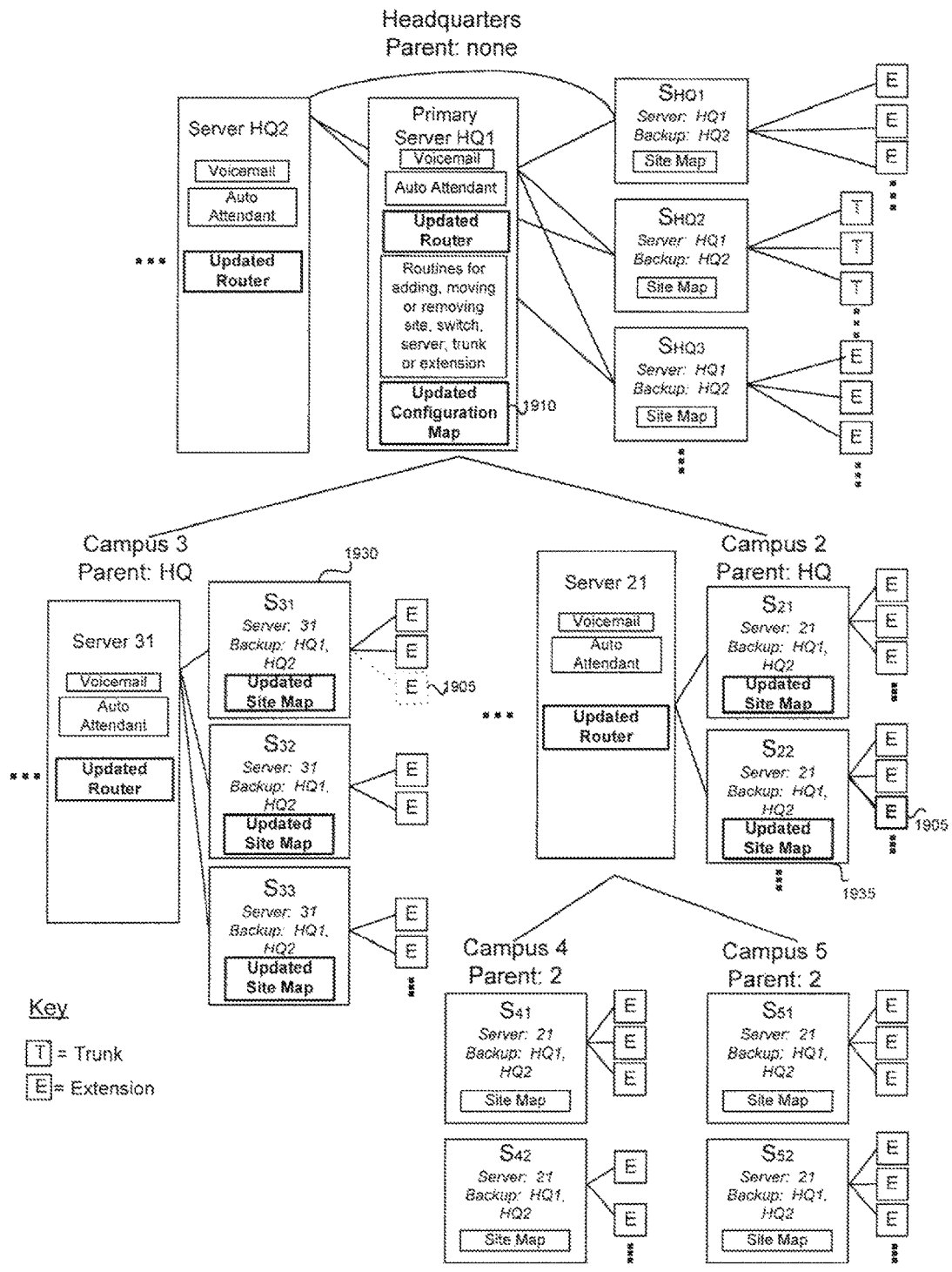
FIG. 19 is a diagram illustrating a sample movement of an extension within an IP telephony network.
Figure 38:
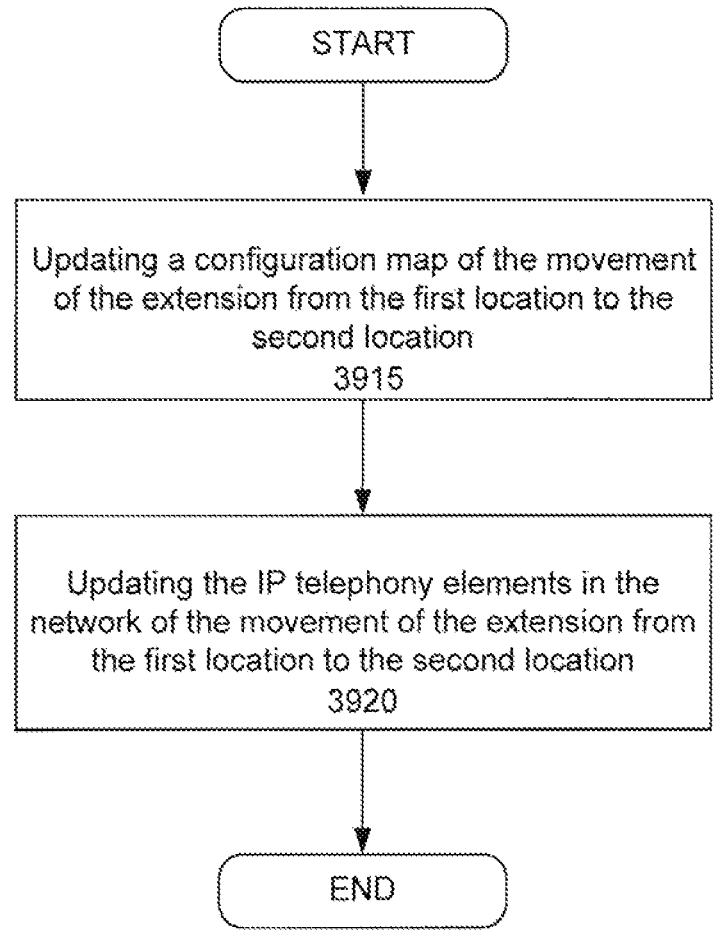
FIG. 38 is a flow diagram of a preferred method for moving an extension within an IP telephony network.
Figure 39:
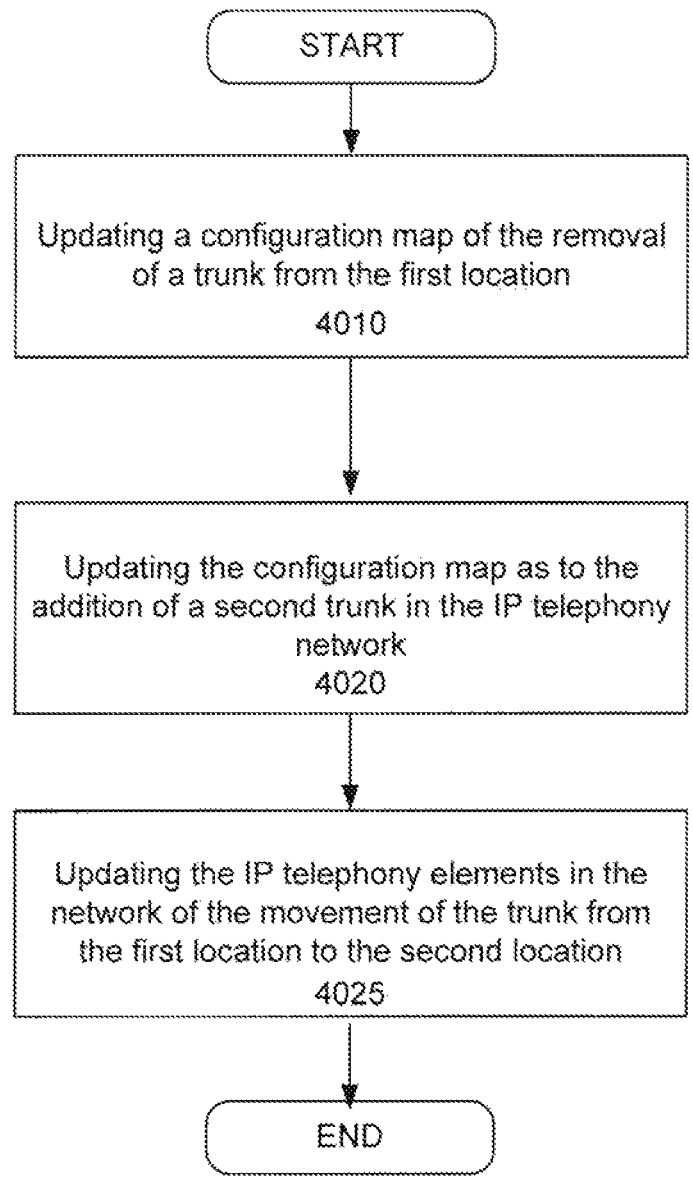
FIG. 39 is a flow diagram of a preferred method for moving a trunk within an IP telephony network.

FIG. 19 illustrates a preferred embodiment and FIG. 38 a preferred method for moving an extension 1905 from switch $S_{31}$ 1930 in Campus 3 in the network to switch $S_{22}$ 1935 in Campus 2. Referring both to FIGS. 19 and 39, the extension 1905 is moved from switch $S_{31}$ 1930 in Campus 3 to switch $S_{22}$ 1935 in Campus 2 by updating 3915 a configuration map 1910 of the movement of the extension 1905 from Campus 3 to Campus 2 and updating 3920 the IP telephony elements in the network of the movement of the extension 1905. In a preferred embodiment of the invention, updating 3920 includes updating all site maps located at the sites of the first location (i.e., Campus 3) and the second location (i.e., Campus 2) and updating all servers in the network, specifically the router in the servers. However, not all switches nor all servers need be updated in the present invention.

In an alternative embodiment and method, moving an extension 1905 from a first location to a second location can be accomplished by removing the extension 1905 from the first location and adding a new extension to the second location. Preferred methods for how to accomplish these two steps are described above.

Figure 20:
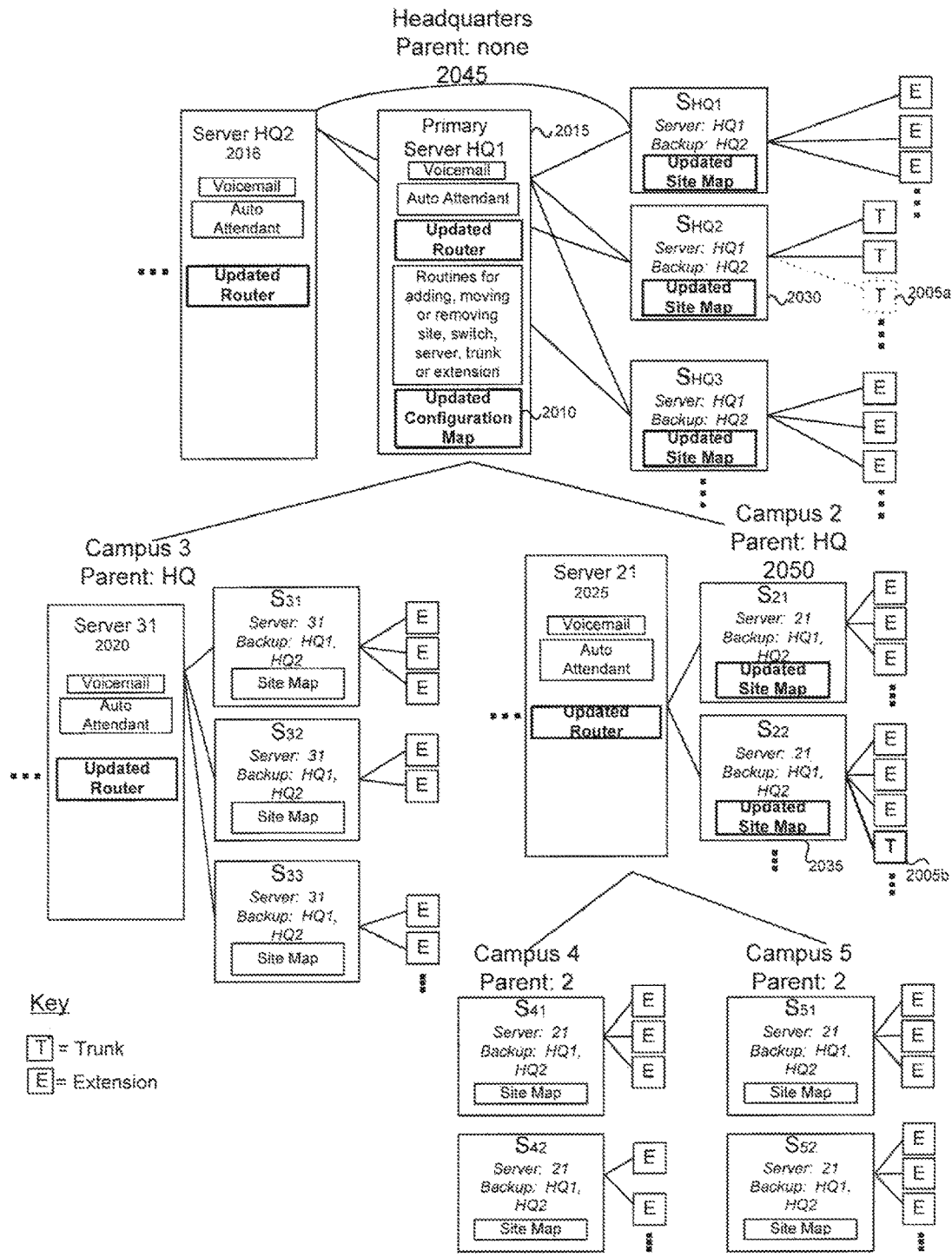
FIG. 20 is a diagram illustrating a sample movement of a trunk within an IP telephony network.

FIG. 20 illustrates a preferred embodiment and FIG. 39 a preferred method for moving a trunk from switch $S_{HQ2}$ 2030 in the headquarter site 2045 to switch $S_{22}$ 2035 in Campus 2 in the network. Referring to both FIGS. 20 and 40, the trunk is moved from switch $SH_{HQ2}$ 2030 in the headquarter site 2045 to switch $S_{22}$ 2035 in Campus 2 by updating 4010 a configuration map 2010 of the removal of the trunk 2005a from switch $S_{HQ2}$ 2030 at the headquarter site, updating 4020 a configuration map 2010 as to the addition of a new trunk 2005b in the IP telephony network and updating 4025 the IP telephony elements in the network of the movement of the trunk from switch $S_{HQ2}$ 2030 in the headquarter site to switch $S_{22}$ 2035 in Campus 2 2050. In a preferred embodiment, updating 4025 the IP telephony elements includes updating all servers 2015, 2016, 2020 and 2025 in the network, specifically the router in a server, and updating the switches, particularly the site maps, located at the sites from which 2045 and to which 2050 the trunk is moved.

In an alternative embodiment and method, moving a trunk from a first location to a second location need not be accomplished by removing the trunk from the first location and adding a new trunk to the second location. Instead, it is possible to use the same trunk, moving it from the first location to the second location. The details of how to accomplish this would be known to one of ordinary skill in the art in light of the prior discussion above.

Figure 21:
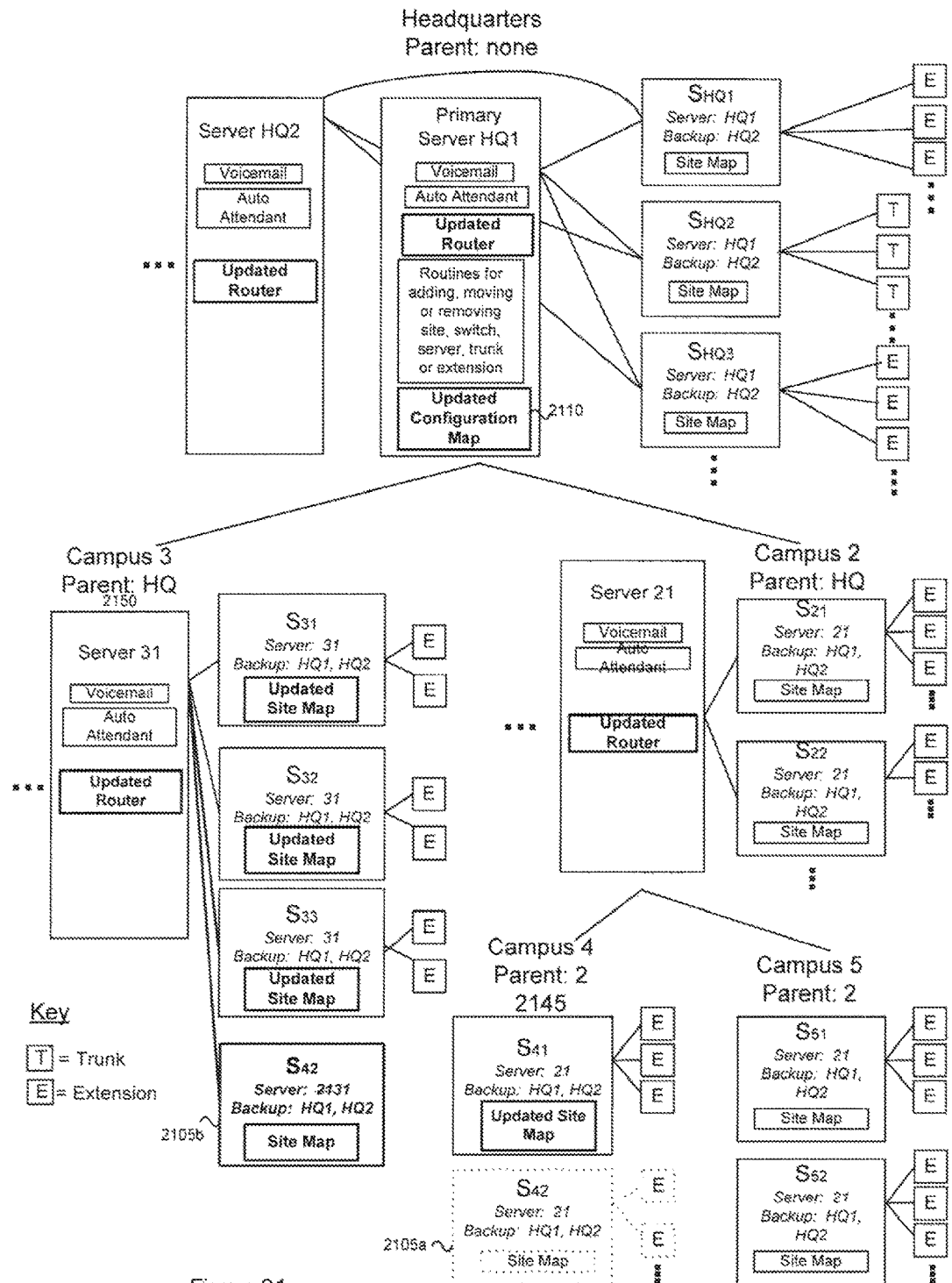
FIG. 21 is a diagram illustrating a sample movement of a switch within an IP telephony network.
Figure 40:
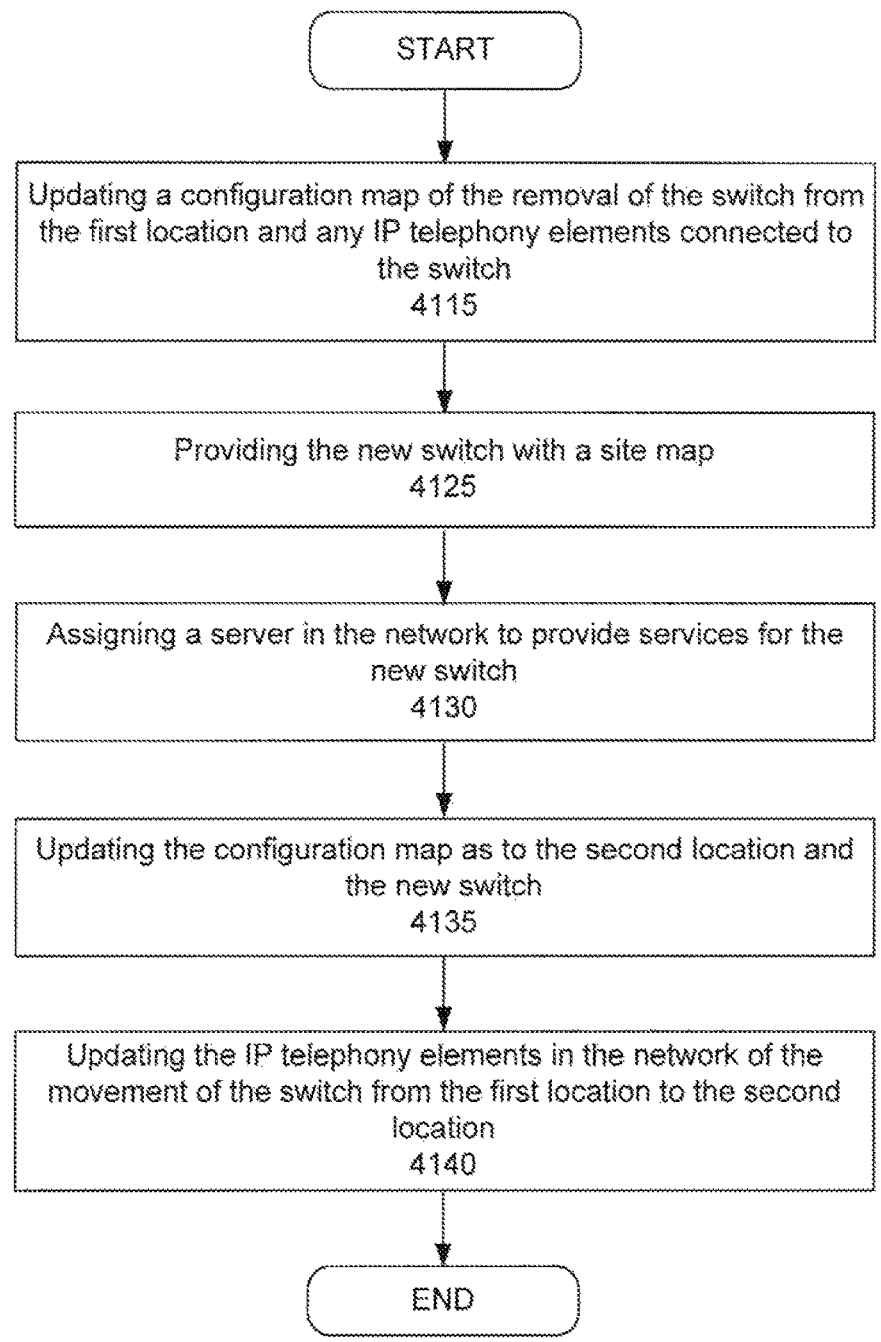
FIG. 40 is a flow diagram of a preferred method for moving a switch within an IP telephony network.

FIG. 21 illustrates a preferred embodiment and FIG. 40 a preferred method for moving a switch from Campus 4 to Campus 3 in the network. Referring to both FIGS. 21 and 41, the switch is moved by updating 4115 a configuration map 2110 of the removal of the switch 2105a and any IP telephony elements connected to the switch 2105a from Campus 4, providing 4125 the new switch 2105b with a site map, assigning 4130 a server in the network to provide services for the new switch 2105b, updating 4135 the configuration map 2110 as to the new switch 2105b and the location of the new switch 2105b and updating 4140 the IP telephony elements in the network of the movement of the switch from Campus 4 to Campus 3. In a preferred embodiment of the invention, updating 4140 the IP telephony elements includes updating all servers in the network, specifically the routers and updating all switches, particularly the site maps, located at the sites from which 2145 and to which 2150 the switch is moved.

In an alternative embodiment and method, moving a switch from a first location to a second location need not be accomplished by removing the switch from the first location and adding a new switch to the second location. Instead, it is possible to use the same switch. The details of how to accomplish this would be known to one of ordinary skill in the art in light of the discussion above.

Figure 22:
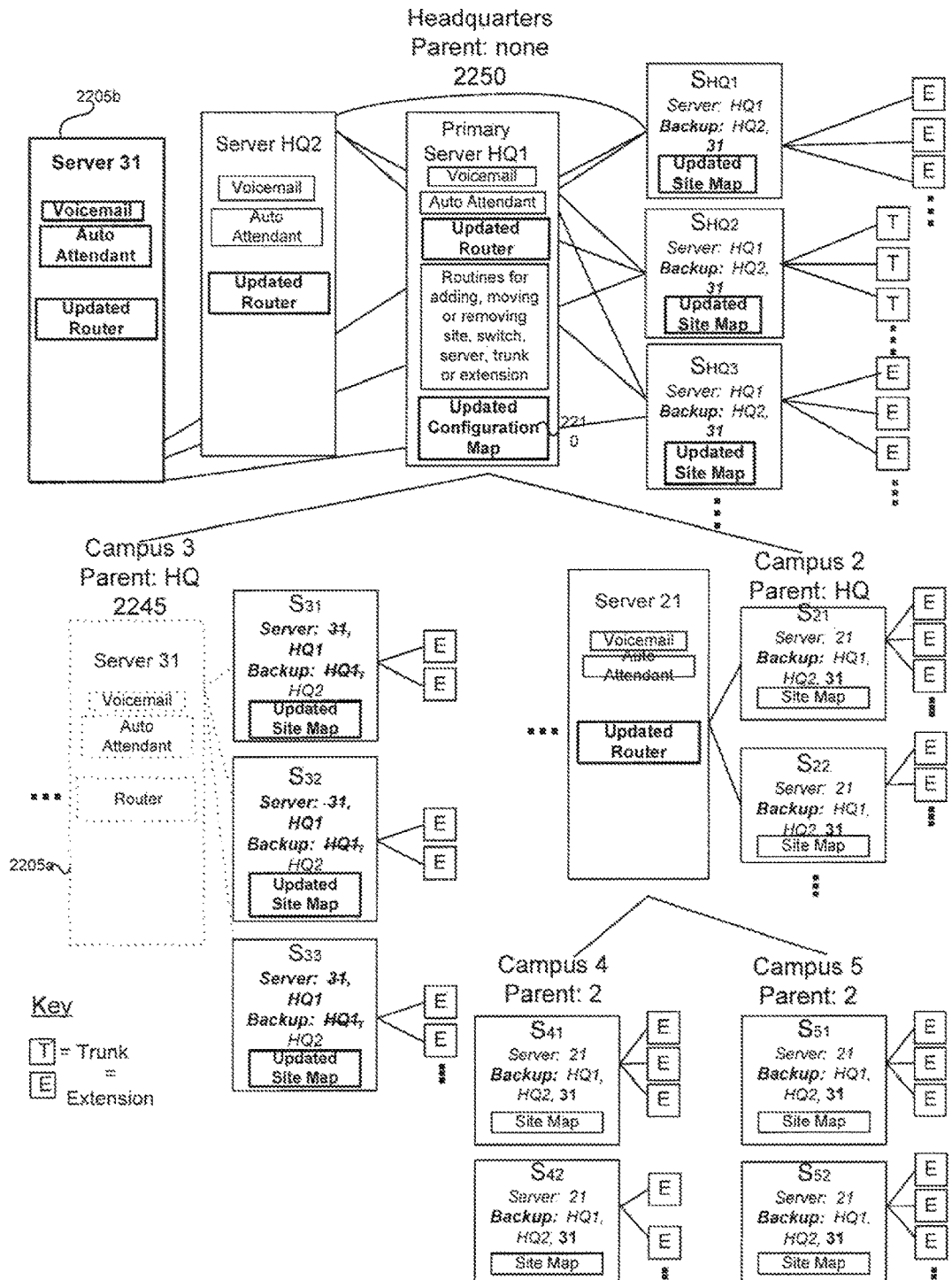
FIG. 22 is a diagram illustrating a sample movement of a server within an IP telephony network.
Figure 41:
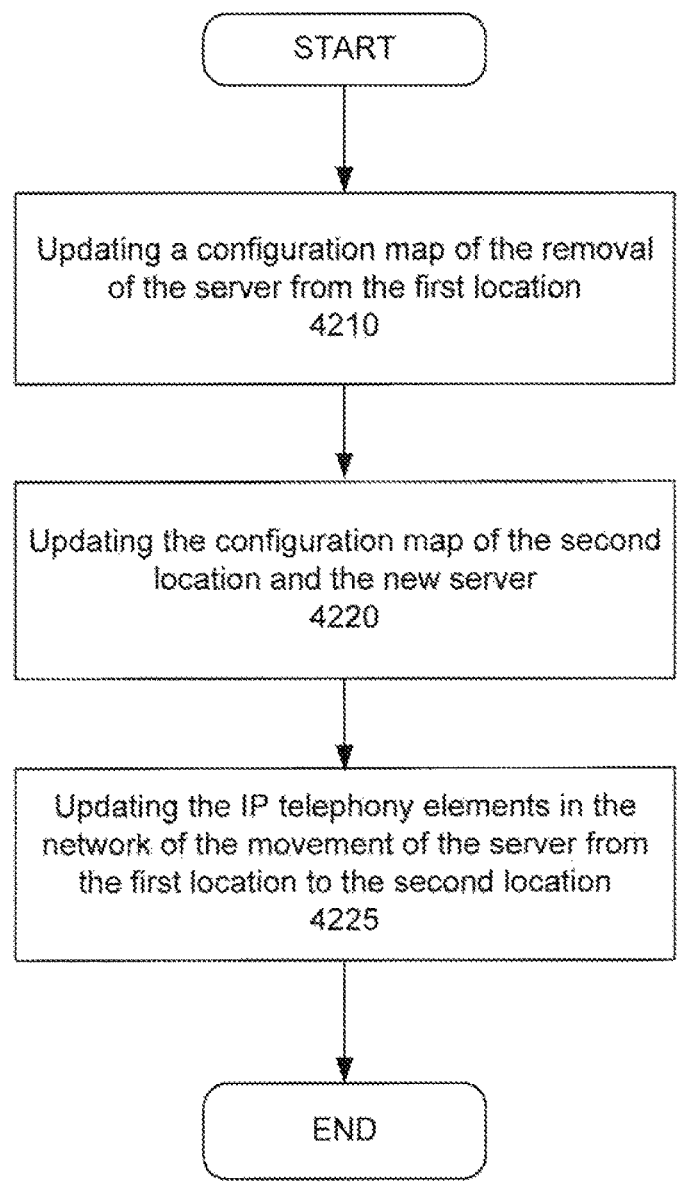
FIG. 41 is a flow diagram of a preferred method for moving a server within an IP telephony network.

FIG. 22 illustrates a preferred embodiment and FIG. 41 a preferred method for moving a server from Campus 3 to the headquarter site in the network. Referring to both FIGS. 22 and 42, the server is moved by updating 4210 a configuration map 2210 of the removal of the server 2205a from Campus 3, updating 4220 the configuration map 2210 of the new location at the headquarter site of the new server 2205b and updating 4225 the IP telephony elements in the network of the movement of the server from Campus 3 to the headquarter site. In a preferred embodiment of the invention, updating 4225 the IP telephony elements includes updating all servers in the network, particularly the routers and updating all switches, particularly the site maps, servers and backup servers assigned to the switches located at the sites affected by the move of the server.

For example, as illustrated in the bold font in FIG. 22, the server and/or backup servers for switches $S_{31}$, $S_{32}$ and $S_{33}$ in Campus 3, switches $S_{HQ1}$, $S_{HQ2}$ and $S_{HQ3}$ at the headquarter site, switches $S_{21}$ and $S_{22}$ in Campus 2, switches $S_{41}$ and $S_{42}$ in Campus 4, and switches $S_{51}$ and $S_{52}$ in Campus 5, have been updated in light of the movement of server 31 from Campus 3 to the headquarter site. In addition, the servers in the network, specifically the router, have also been updated, particularly the routers, as shown in bold font in FIG. 22.

In an alternative embodiment and method, moving a server 2205 from a first location to a second location need not be accomplished by removing the server 2205 from the first location and adding a server switch to the second location. Instead, it is possible to use the same server 2205. The details of how to accomplish this would be known to one of ordinary skill in the art in light of the discussion above.

Figure 23:
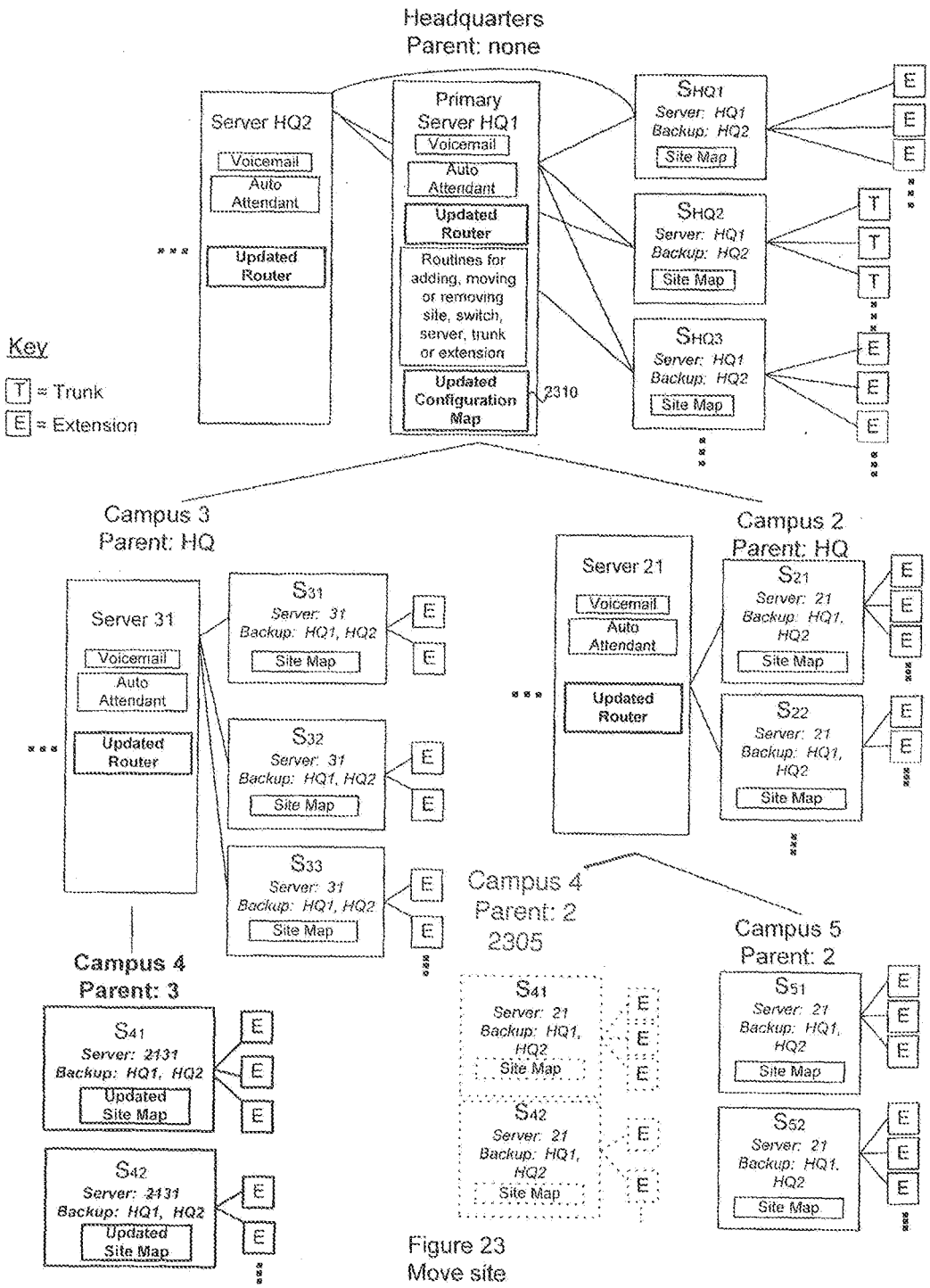
FIG. 23 is a diagram illustrating a sample movement of a site within an IP telephony network.
Figure 42:
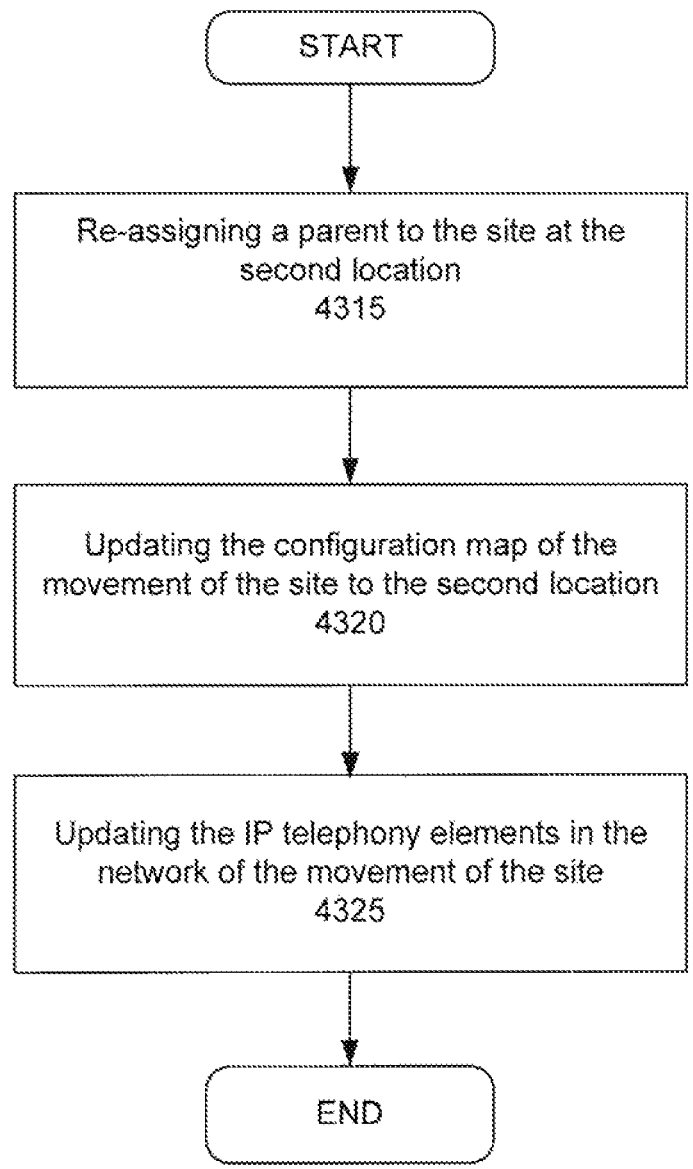
FIG. 42 is a flow diagram of a preferred method for moving a site within an IP telephony network.

FIG. 23 illustrates a preferred embodiment and FIG. 42 a preferred method for moving a site 2305 from Campus 4, a child site of Campus 2, in the IP telephony network to Campus 4, a child site of Campus 3, in the network. Referring both to FIGS. 23 and 43, the site 2305 is moved from child site of Campus 4 to a child site of Campus 3 by re-assigning 4315 a parent site (in the case illustrated in FIG. 23, Campus 3 is the new parent site) to the site 2305, updating 4320 the configuration map 2310 of the movement of the site 2305 (including the movement of all IP telephony elements at the site 2305) from child site of Campus 4 to child site of Campus 3 and updating 4325 the other IP telephony elements in the network of the movement of the site 2305 (and all IP telephony elements at the site 2305) from child site of Campus 4 to child site of Campus 3. In a preferred embodiment of the invention, updating 4325 includes updating all the servers in the network, specifically the router in the servers. Note that if Campus 3 already had a child site called Campus 6, and if Campus 4 were inserted between Campus 3 and Campus 6, then Campus 6 would also need to be updated since it is a younger generation site. Moreover, when Campus 4 2305 was a child of Campus 2 (i.e., before movement as a child of Campus 3), if Campus 4 had a child site called Campus 7, Campus 7 may also need to be updated due to the movement of Campus 4 from site 2305, especially if Campus 4 had servers which provided services to the switches at Campus 7.

In an alternative embodiment and method, moving a site 2305 from a first location to a second location can be accomplished by removing the site 2305 from the first location and adding a new site to the second location. The details of how to accomplish this would be known to one of ordinary skill in the art in light of the discussions above.

FIG. 43 illustrates a preferred method for locating a second extension or trunk from a first extension by determining 4405 from a site map of the switch to which the first extension is connected (or, in an alternative embodiment, from the configuration map) if the second extension or trunk is located at the same site as the first extension. If yes, the second extension or trunk, as applicable, has been located. If no, the IP telephony network 100 determines 4410 from a router in a server, either the server assigned to the switch to which the extension is connected or any other server in the network, (or, in an alternative embodiment, the configuration map) the location of the second extension or trunk, as applicable. As illustrated in FIG. 44, the same method may be used to locate a second extension or trunk from a first trunk.

The invention claimed is:

1. A system for managing an IP telephony network having a plurality of sites, comprising:
    a configuration map organizing each of the plurality of sites in the IP telephony network relative to at least one other site;
    a routine for managing the IP telephony network, the routine having access to the configuration map;
    a first IP telephony element having a first association with a parent site, wherein a location of the first IP telephony element relative to other IP telephony elements in the IP telephony network is defined in the configuration map; and
    a second IP telephony element having a second association with the first IP telephony element, wherein the routine determines a parent site of the second IP telephony element based upon the first IP telephony element and associates the determined parent site with the second IP telephony element in the configuration map.

2. The system of claim 1, wherein the determined parent site is the parent site of the first IP telephony element.

3. The system of claim 1, wherein the first IP telephony element is a switch and the second IP telephony element is an extension associated with the switch.

4. The system of claim 1, wherein the first IP telephony element has an IP address and the IP address is stored in the configuration map.

5. The system of claim 1, wherein a communicative coupling between the plurality of sites is different than logical coupling information stored in the configuration map describing the organization of each of the plurality of sites in the IP telephony network relative to the at least one other site.

6. The system of claim 1, wherein the second IP telephony element is part of a first site, and the routine updates the second IP telephony element to have a third association with a third IP telephony element at a second site.

7. The system of claim 6, wherein at least one of the first IP telephony element, the second IP telephony element, or the third IP telephony element are moved in the IP telephony network, and the routine detects the movement and updates one or more of the associations in the configuration map based on the movement.

8. The system of claim 6, wherein at least one of the first IP telephony element, the second IP telephony element, or the third IP telephony element are moved in the IP telephony network, and the routine detects the movement and updates the configuration map based on the moved IP telephony element and updates one or more non-moved IP telephony elements in the IP telephony network based on the configuration map.

9. The system of claim 8, wherein the moved IP telephony element comprises a switch having an associated site map used to locate IP telephony elements within a site.

10. A method of updating a first site to be associated with a parent site in a configuration map of an IP telephony network, the method comprising:
    organizing a plurality of sites within the IP telephony network so that an IP telephony element at the first site receives services from a first server;
    associating the parent site with the first site; thereafter
    updating the configuration map with the association between the parent site and the first site; and
    updating the IP telephony element based on the updated configuration map to receive services from a second server that is part of a second site that is closer in the configuration map to a headquarters site than the first site is in the configuration map to the headquarters site and that has the services available.

11. The method of claim 10, wherein the headquarters site is a site in the IP telephony network that does not have a parent site in the configuration map.

12. The method of claim 10, wherein the IP telephony element is updated after the configuration map is updated.

13. The method of claim 10, wherein the configuration map is stored on a server in the IP telephony network other than a primary server located at the headquarters site.

14. A method of utilizing a configuration map to identify a location of a service in an IP telephony network, the configuration map defining the location of each of the sites in the IP telephony network relative to each other, the method comprising:
    searching a first site to determine if the service is available at the first site;
    if the service is not available at the first site, locating a second site that is closer to a headquarters site in the configuration map than the first site is to the headquarters site in the configuration map; and
    searching the second site that is closer to the headquarters site to determine if the service is available.

15. The method of claim 14, wherein the headquarters site is a site in the IP telephony network that does not have a parent site in the configuration map.

16. The method of claim 14, wherein the service identified is a backup service.

17. The method of claim 14, wherein the configuration map is stored on a server in the IP telephony network other than a primary server located at the headquarters site.

18. The method of claim 14, wherein the configuration map is stored on a server in the IP telephone network at a site other than the headquarters site.

19. The method of claim 14, wherein the service is provided by a switch.

20. The method of claim 14, wherein the service is a voicemail service.

21. A method for managing an IP telephony network having a plurality of sites, the method comprising:
    providing a configuration map that organizes each of the plurality of sites in the IP telephony network relative to at least one other site;
    associating a first IP telephony element with a first parent site;
    updating the configuration map to include the association between the first IP telephony element and the first parent site;
    associating a second IP telephony element with the first IP telephony element; and
    updating the configuration map to include the association between the second IP telephony element and the first IP telephony element, wherein after the updates, the configuration map includes locations of the first IP telephony element and the second IP telephony element relative to other IP telephony elements in the IP telephony network.

22. The method of claim 21 further comprising determining a second parent site of the second IP telephony element based on the associating between the first IP telephony element and the first parent site.

23. The method of claim 22 wherein the first parent site and the second parent site are the same site.

24. The method of claim 21, wherein the first IP telephony element is a switch and the second IP telephony element is an extension associated with the switch.

\* \* \* \* \*